United States Patent [19]
Okamoto et al.

[11] Patent Number: 6,120,104
[45] Date of Patent: *Sep. 19, 2000

[54] WHEEL COVER

[76] Inventors: Yoshiaki Okamoto; Hiromu Okamoto, both of 384-1 Higashi-Futami, Futami-chou, Akashi-shi, Hyogo-ken; Yuko Okamoto, 4-3-6 Midosuji, Nada-ku, Kobe-shi, Hyogo-ken, all of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,893

[22] Filed: Oct. 3, 1997

[30] Foreign Application Priority Data

Oct. 9, 1996 [JP] Japan .................................. 8-303451
Apr. 4, 1997 [JP] Japan .................................. 9-102509

[51] Int. Cl.⁷ ............................... B60B 7/04; B09F 21/04
[52] U.S. Cl. .................................... 301/37.25; 301/37.37; 40/587
[58] Field of Search ........................ 40/587; 301/37.25, 301/37.37, 37.34, 37.42, 6.3

[56] References Cited

U.S. PATENT DOCUMENTS

| | | | |
|---|---|---|---|
| 1,432,274 | 10/1922 | Braucher | 301/37.25 |
| 1,478,475 | 12/1923 | Jago et al. | 40/587 |
| 1,665,437 | 4/1928 | Booth | 301/37.37 |
| 2,130,220 | 9/1938 | Ball et al. | 301/37.25 |
| 2,169,237 | 8/1939 | Gasco | 301/108.1 |
| 2,548,070 | 4/1951 | Ryan | 301/37.25 |
| 2,631,204 | 3/1953 | Kibiger | 40/587 |
| 2,707,131 | 4/1955 | Sundberg | 301/108.1 |
| 2,754,154 | 7/1956 | Solow | 301/37.25 |
| 2,759,282 | 8/1956 | Lecourt | 40/587 |
| 2,762,469 | 9/1956 | Lyon | 301/37.25 |
| 2,869,262 | 1/1959 | Lucas | 40/587 |
| 2,997,344 | 8/1961 | Whiteman | 301/37.25 |
| 3,005,906 | 10/1961 | Butler, Jr. | 301/108.1 |
| 3,219,391 | 11/1965 | Hettinger | 301/37.25 |
| 3,722,958 | 3/1973 | Marshall | 301/37.25 |
| 3,918,186 | 11/1975 | Gray | 301/37.25 |
| 4,040,582 | 8/1977 | Krauss | 301/37.34 |
| 4,678,239 | 7/1987 | Matsushita | 301/37.25 |
| 4,707,035 | 11/1987 | Kondo et al. | 301/37.37 |
| 4,929,030 | 5/1990 | Park | 301/37.25 |
| 4,981,329 | 1/1991 | Koch et al. | 301/37.25 |
| 5,190,354 | 3/1993 | Levy et al. | 301/37.25 |
| 5,263,770 | 11/1993 | Goudey | 301/37.1 |
| 5,490,342 | 2/1996 | Rutterman et al. | 301/37.25 |
| 5,588,715 | 12/1996 | Harlen | 301/37.25 |
| 5,659,989 | 8/1997 | Hsiao et al. | 301/37.25 |
| 5,957,542 | 9/1999 | Boothe et al. | 301/37.25 |

FOREIGN PATENT DOCUMENTS

| | | | |
|---|---|---|---|
| 541032 | 5/1957 | Canada | 301/37.37 |
| 925539 | 5/1973 | Canada | 301/37.37 |
| 330534 | 8/1989 | European Pat. Off. | 301/37.25 |

*Primary Examiner*—S. Joseph Morano
*Assistant Examiner*—Long Bao Nguyen
*Attorney, Agent, or Firm*—Jordan and HamburgLLP

[57] ABSTRACT

A wheel cover comprises a fixable side fixture fixably secured to the center of a wheel of a car, as to be able to position to the central part thereof; a movable side fixture pivoyably mounted to the central part of the fixable side fixturethrough a bearing; a wheel cover body in the shape of a disk mounted to the movable side fixture, having a space between the wheel; and a weight mounted to said movable side fixture or wheel cover body, in order to prevent to rotate the wheel cover body so that people can see the design drawn onto the wheel cover body because the rotating of the wheel cover body can be prevented if the tire rotates, moreover, the wheel cover is positioned the up and downward thereof and can be prevented to be unsightly design.

15 Claims, 47 Drawing Sheets

FIG.29
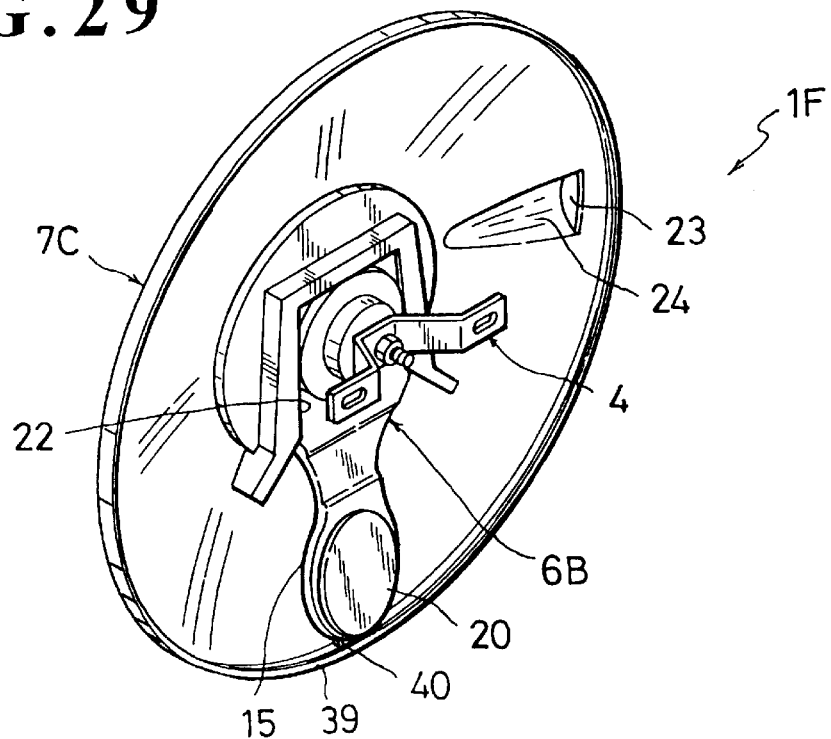
FIG.30a
FIG.30b
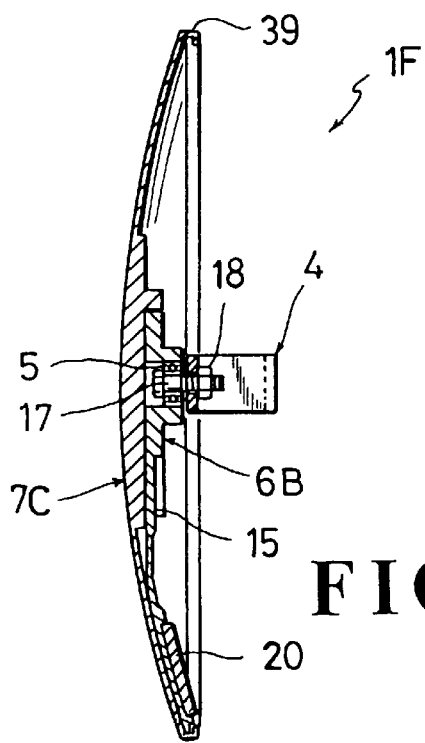

FIG.50
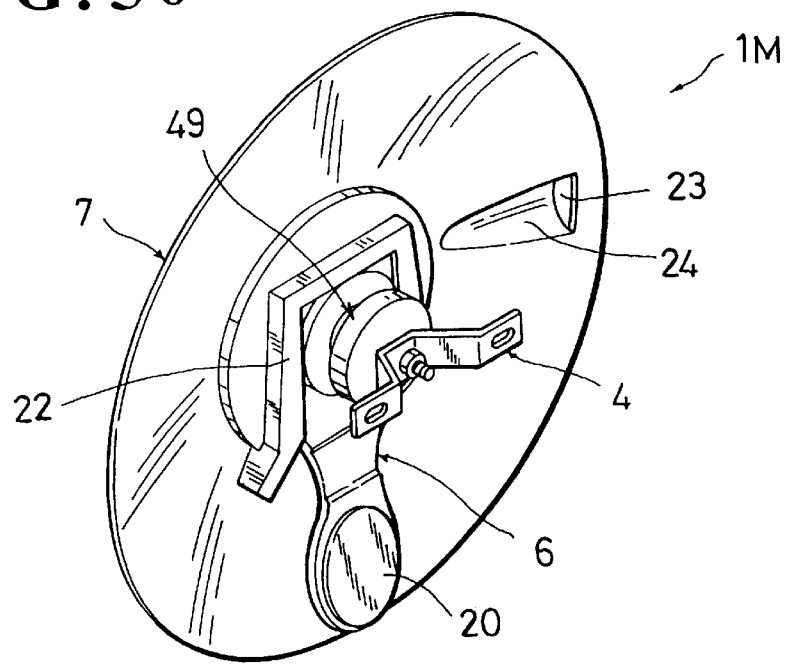
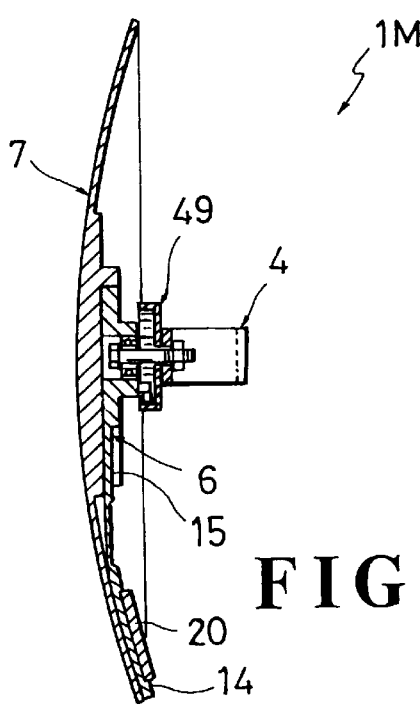
FIG.51a
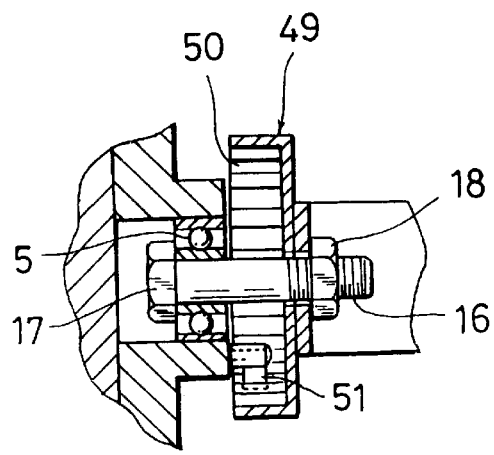
FIG.51b 6,120,104

WHEEL COVER

BACKGROUND OF THE INVENTION

The present invention relates to a wheel cover for automobile e.g a passenger car, a truck, or a bus.

A conventional wheel cover comprises a wheel cover body covering the disc part of wheel and a multiplicity of fitting pieces forming the wheel cover body, fitably fixed to the disc part or rim of the wheel.

The conventional wheel cover is fitably fixed to the disc part or rim of the wheel with the multiplicity of fitting piece. Therefore, people cannot see the design drawn on the wheel cover body because the wheel cover body rotates with the wheel as one during running.

Also, people can see the design drawn to the wheel cover during stopping. However, the design having up, down, right and leftward itself can not be adopted because the stopped position of the wheels is not always desired, and the design may stop in the opposite direction. Therefore, the design is subject to restriction and can not give designers a free hand.

SUMMARY OF THE INVENTION

It is an object of the present invention to provide a wheel cover which can prevent rotation the wheel cover body when the wheel itself rotates and which allows the design drawn to the wheel cover to be seen.

It is another object of the present invention to provide a wheel cover which can always b positioned up and downward of the wheel cover body.

It is another object of the present invention to provide a wheel cover which can avoid unsightly design.

The above and further objects and novel features of the invention will more fully appear from the following detailed desciption when the same is needed in connection with the accompanying designs. It is for the purpose of illustration only and is not intended as a defintion of the limits of the invention.

BRIEF DESCRIPTION OF THE DRAWINGS

FIG. 29 is a perspective view of back side showing a seventh embodiment of the present invention;

FIG. 30 is a cross-sectional view showing a seventh embodiment of the present invention;

FIG. 50 is a perspective view from a back side showing a fourteenth embodiment of the present invention;

FIG. 51 is a vartical cross-sectional view showing a fourteenth embodiment of the present invention;

DESCRIPTION OF THE PREFERRED EMBODIMENT

Figure 1:
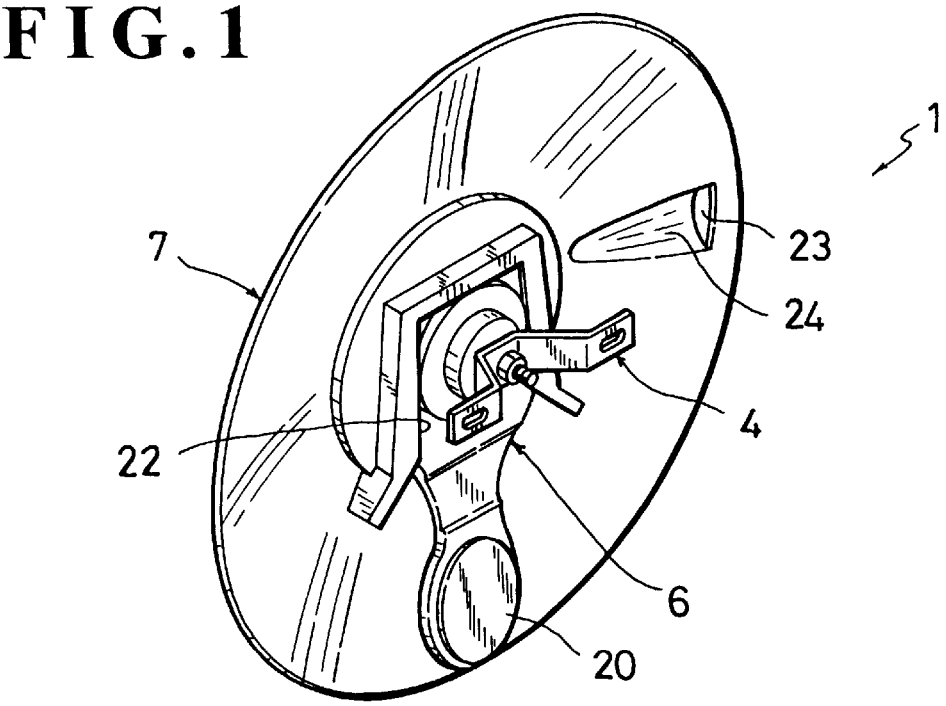
FIG. 1 is a perspective view from a back side showing a first embodiment of the present invention.
Figure 2:
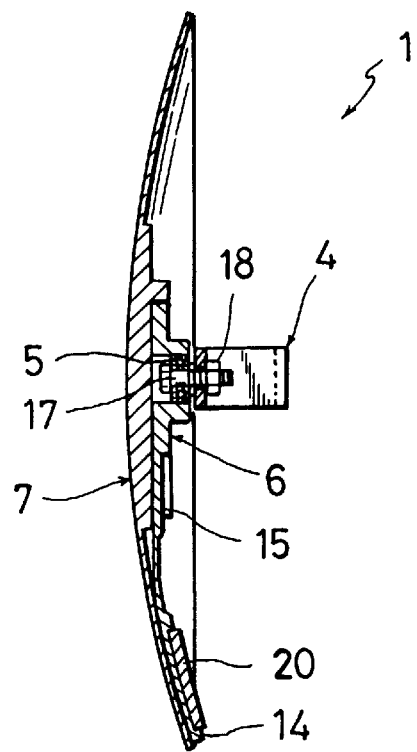
FIG. 2 is a vertical cross-sectional view showing a first embodiment of the present invention.

Preferred embodiments of the present invention are described in more detail below referring to the accompanying drawings.

FIGS. 1 to 13 illustrate a first embodiment of the present invention wherein a wheel cover 1 is mounted to a wheel 3 of the automobiles e. g. a trunk, a bus, a car, and wherein a passenger car 2 is elected in this embodiment. The wheel cover 1 comprises a fixable side fixture 4, a movable side fixture 6 and a wheel cover body 7 in the shape of disc. The fixable side fixture 4 is fixably mounted at a place that the central part of the fixable side fixture 4 can be positioned to the center of the wheel 3. The side fixture 6 is rotatably mounted to the central part of the fixable side fixture 4 through a bearing 5. The wheel cover body 7 is mounted to the movable side fixture 6 while the wheel cover body 7 has a space between the wheel 3.

Figure 3:
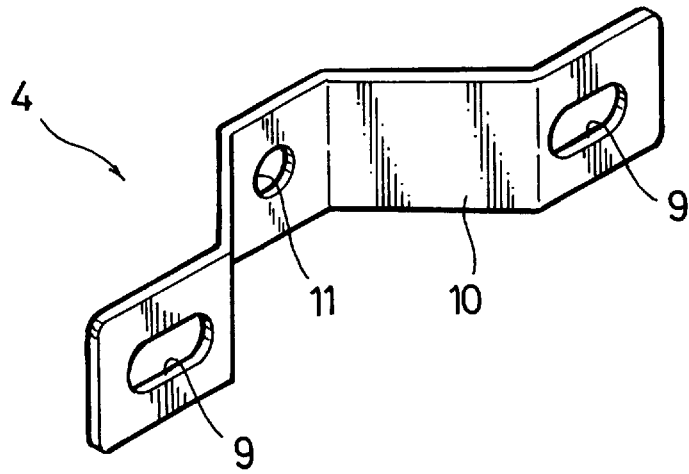
FIG. 3 is an explanation view of a fixable side fixture showing a first embodiment of the present invention.

As illustrated in FIG. 3, the fixable side fixture 4 comprises a fixable side fixture body 10 and an axle insertable hole 11. wheel bolt insertable holes 9, 9 formed at both sides thereof receive wheel bolts 8, 8 inserted therein selectively of vis-a-vis even number of wheel bolts 8 are able to be fixed to the wheel 3. The fixable side fixture body 10 is formed roughly in the shape of a hat. The axle insertable hole 11 is formed in the central part of the fixable side fixture body 10.

Figure 4:
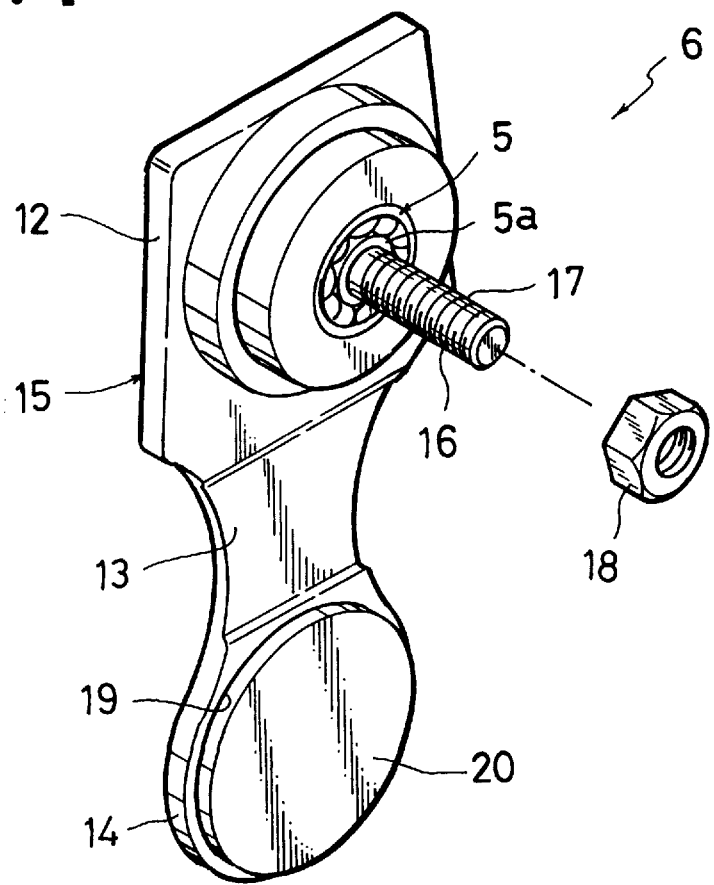
FIG. 4 is an explanation view of a movable side fixture showing a first embodiment of the present invention.

As illustrated in FIG. 4, the movable side fixture 6 comprises a movable side fixture body 15, a ball bearing 5 as a bearing, an axle 17, a nut 18 and a weight 20. The movable side fixture body 15 is made of hard rubber or synthetic resin materials, forming a fitting piece 12 in the shape of a square in an upper part thereof and a weight supporting part 14 through a connection 13 in lower part thereof. The ball bearing 5 is insertably fixed to the nearly central part of the fitting piece 12 of the moval side fixture body 15. The axle 17 is fitably fixed to a rotating ring 5a of the ball bearing 5, inserted into an axle insertable hole 11 of the fixable side fixture 4 and formed thread ares 16 at an outer part thereof. The thread areas 16 of the axle 17 is secured in the nut 18, and the nut 18 fixes the axle 17 to the fixable side fixture 4. The weight 20 is fixed to a weight storage recess 19 formed in the weight supporting part 14 with adhesive.

Moreover, when the air valve projects rather than the surface of the wheel 3 of tire, the lower part of the movable side fixture 6 is planed at the place which is not to touch to to the air valve.

Figure 5:
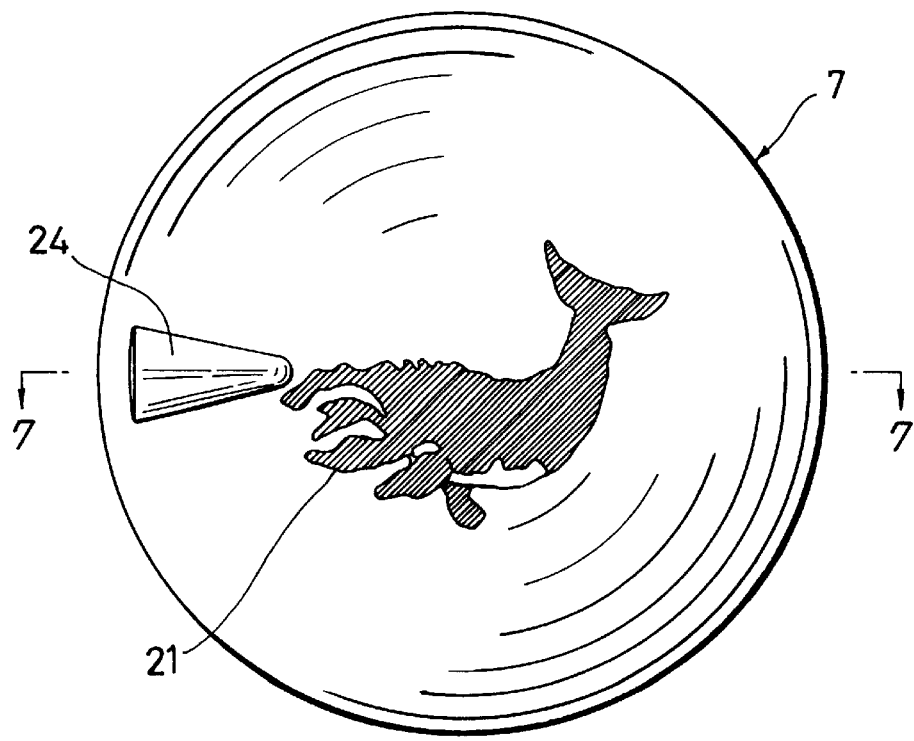
FIG. 5 is a front view of a wheel cover body showing a first embodiment of the present invention.
Figure 6:
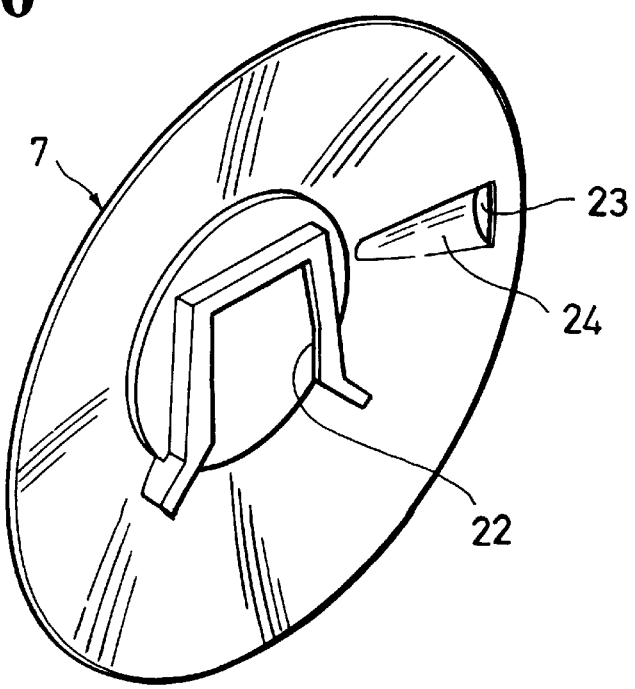
FIG. 6 is a perspective view from a back side of a wheel cover body showing a first embodiment of the present invention.
Figure 7:
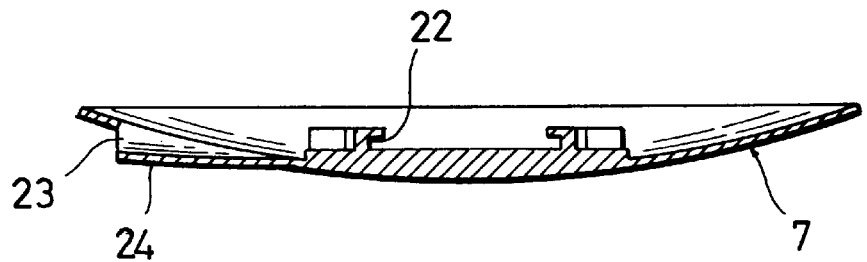
FIG. 7 is a sectional view taken on line 7—7 of FIG. 5.

The wheel cover body 7 has a drawn design 21 which includes advertisement and/or publicity. As illustrated in FIGS. 5 to 7, the wheel cover body 7 is formed of metal or synthetic resin material and comprises a fitting part 22 and an air current guide part 24. The fitting part 22 is formed in the central part of the inner wall thereof and in the shape of channel and section a of angle and can be removably inserted. The air current guide part 24 is a projection formed in the shape of a nose, having an air efflux 23 positioned to the backward during running.

Figure 8:
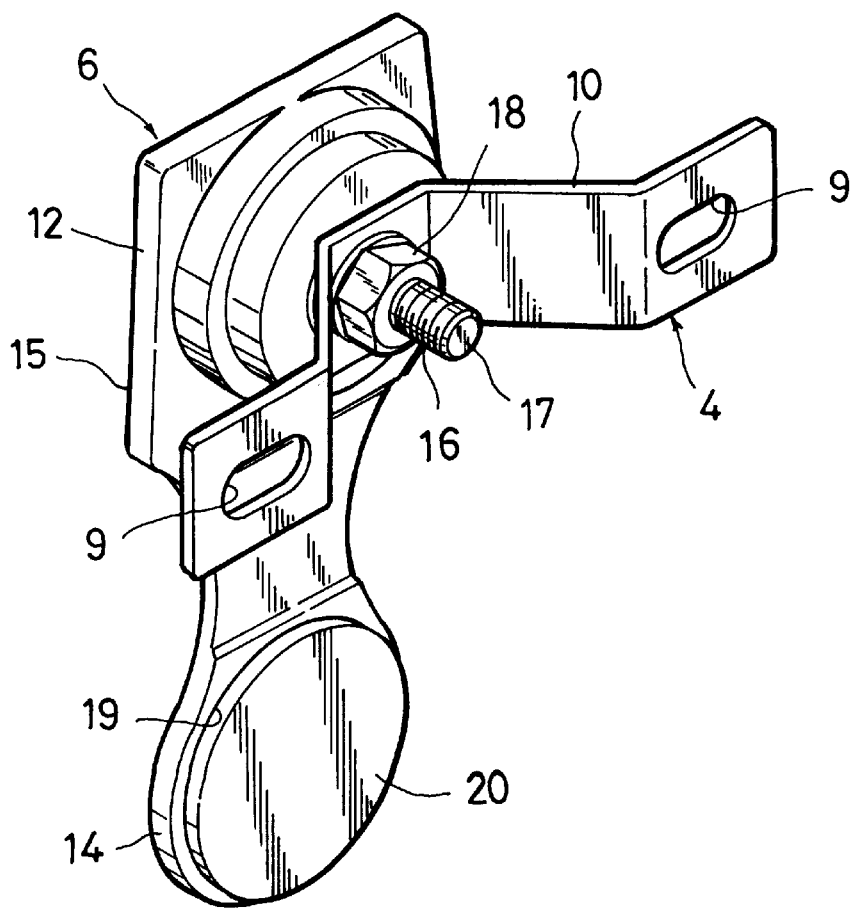
FIG. 8 is an explanation view showing the condition of a movable side fixture mounted to a fixable side fixture.
Figure 9:
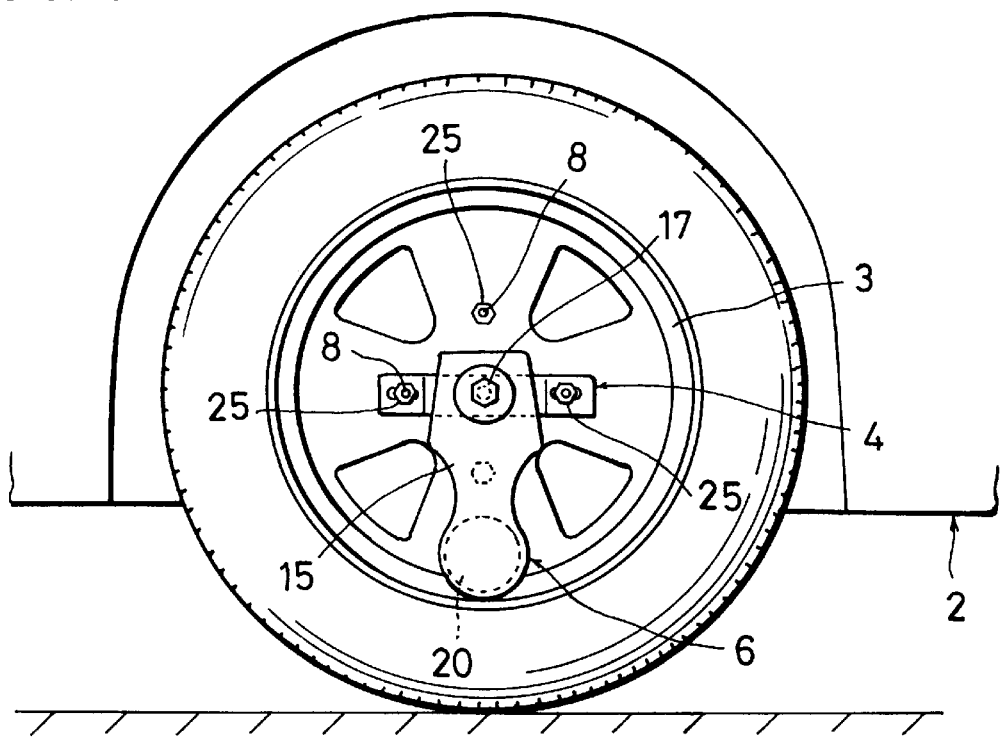
FIG. 9 is an explanation view showing the condition of a fixable side fixture mounted to a wheel.

In the above-mentioned wheel cover 1, as illustrates FIG. 8, the axle 17 of te movable side fixture 6 is inserted into the axle insertable hole 11 of fixable side fixture 4, moreover, the nut 18 is screwed in the axle 17 and the movable side fixture 6 is mounted to the fixable side fixture 4. Secondary, as illustrates FIG. 9, the nut 25, 25, screwed in the wheel 3, is removed. After the wheel bolts 8, 8 are inserted into the wheel bolt insertable holes 9, 9 formed with th both sides of the fixable side fixture 4, the nuts 25, 25 are screwed in the wheel bolts 8, 8 and locked.

Figure 10:
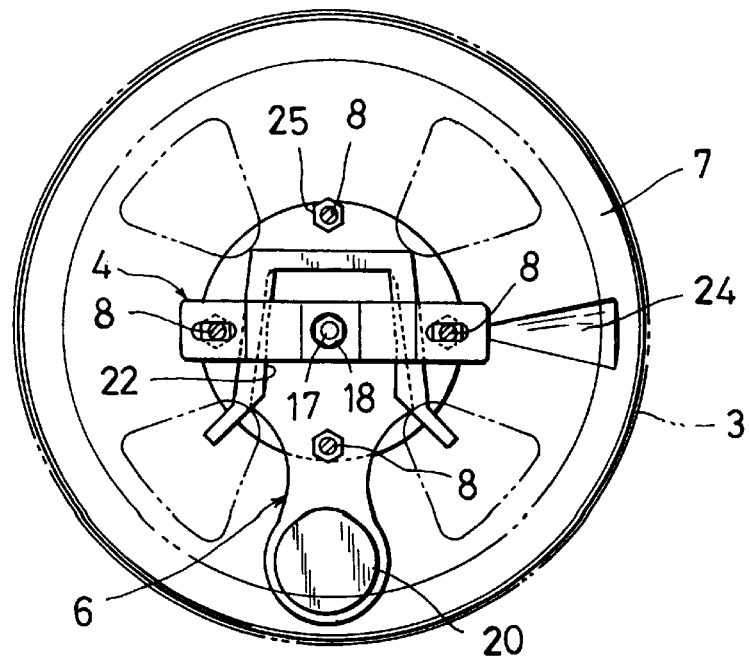
FIG. 10 is an explanation view showing the condition mounted a wheel cover body to a movable side fixture.
Figure 11:
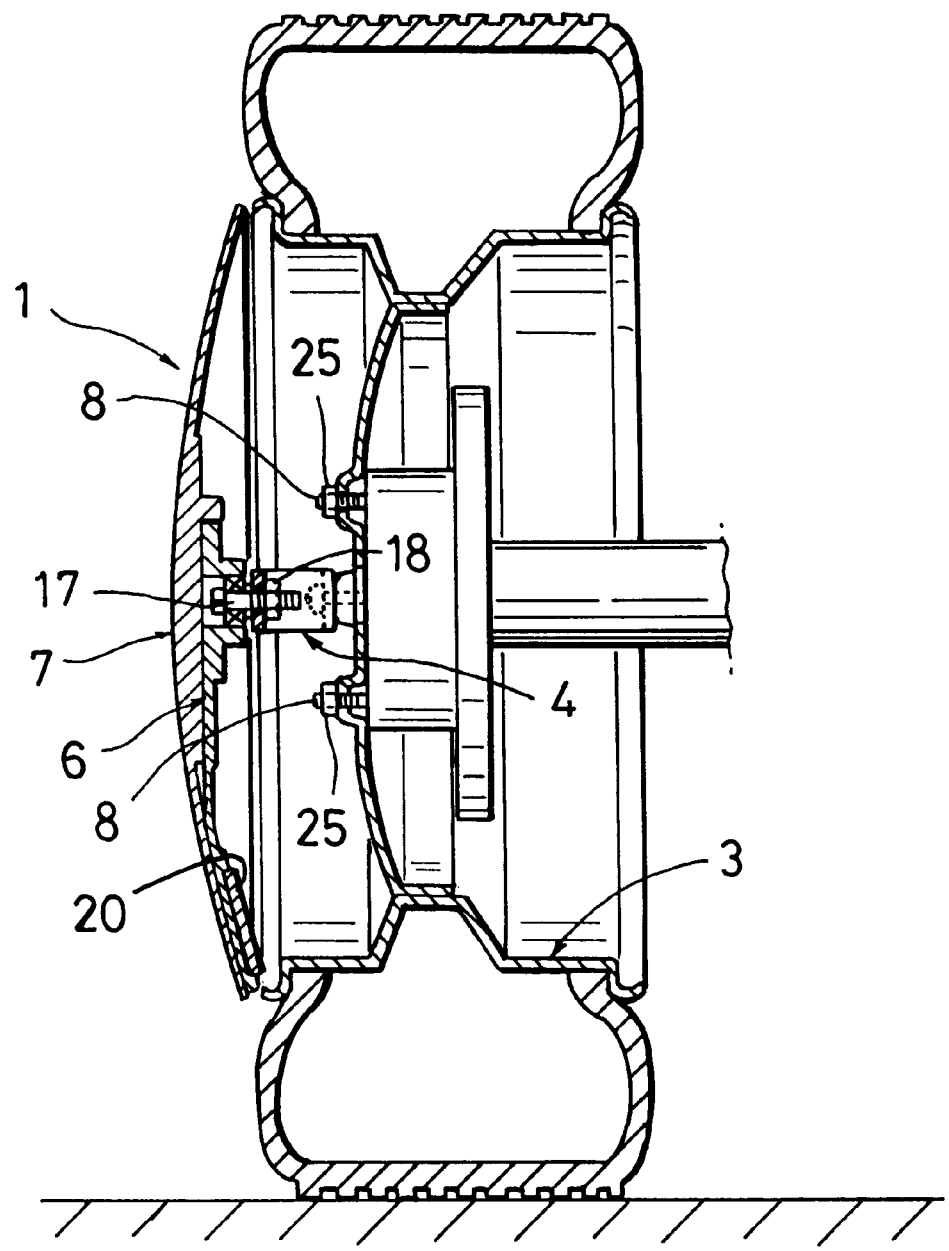
FIG. 11 is a cross-sectional view showing the condition of a wheel cover body to a movable side fixture mounted.
Figure 12:
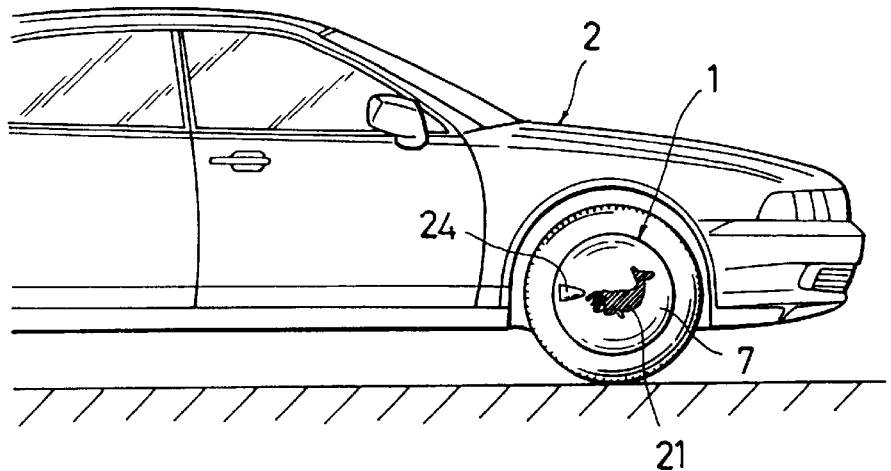
FIG. 12 is an explanation view during use showing a first embodiment of the present invention.

Additionnaly, as illustrates FIGS. 10 and 11, the fitting piece 12 of the movable side fixture 6 is set in the fitting part 22 of the wheel cover 7. Then, the connection 13 of the movable side fixture body 15 tranceforms with flexibility, and the connection 13 and weight supporting part 14 attach closely with the inner wall of the wheel cover body 7. In the above mentioned wheel cover 1 fixed to the wheel 3, the air current guide part 24 of the wheel cover body 7 as illustrates FIG. 12 can position to the backward of the passenger car 2 due to the weight 20 of the movable side fixture 6.

Under this situation, the fixable side fixture 4 as one with rotating the wheel 3 when the passenger car 2 moves, but the movable side fixture 6 and wheel cover body 7 are prevented to rotate due to the weight 20 and ball bearing 5 as a bearing.

Figure 13:
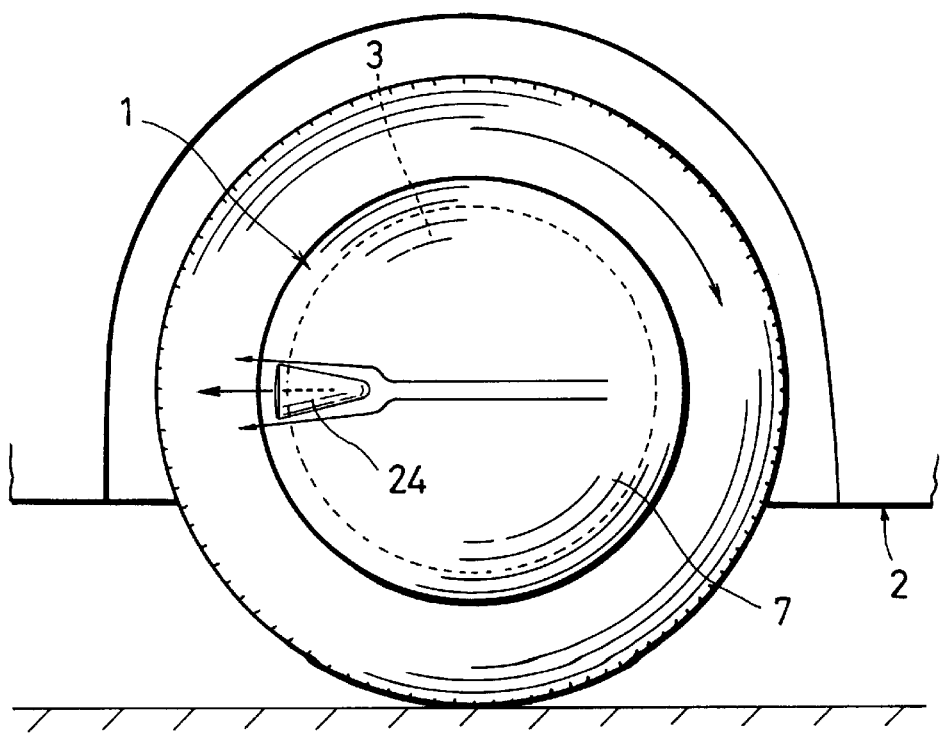
FIG. 13 is an explanation view indicating a flow of an air current during use showing a first embodiment of the present invention.

Moreover, the air current happenes during running of the passenger car 2, but the air current with flowing to the surface of the wheel cover body 7 as illustrates FIG. 13 flows along the upper and lower parts of the air current guide part 24, and the rotating of wheel cover body 7 is prevented because the air inside the wheel cover body 7 is discharged with sucking from the air efflux 23.

The phenomenon shows that the rotating of the wheel cover body 7 is certainly prevented because it works greatly whenever the flow of an air current is fast, that is, the running speed of the passenger car 2 is faster than before.

Figure 71:
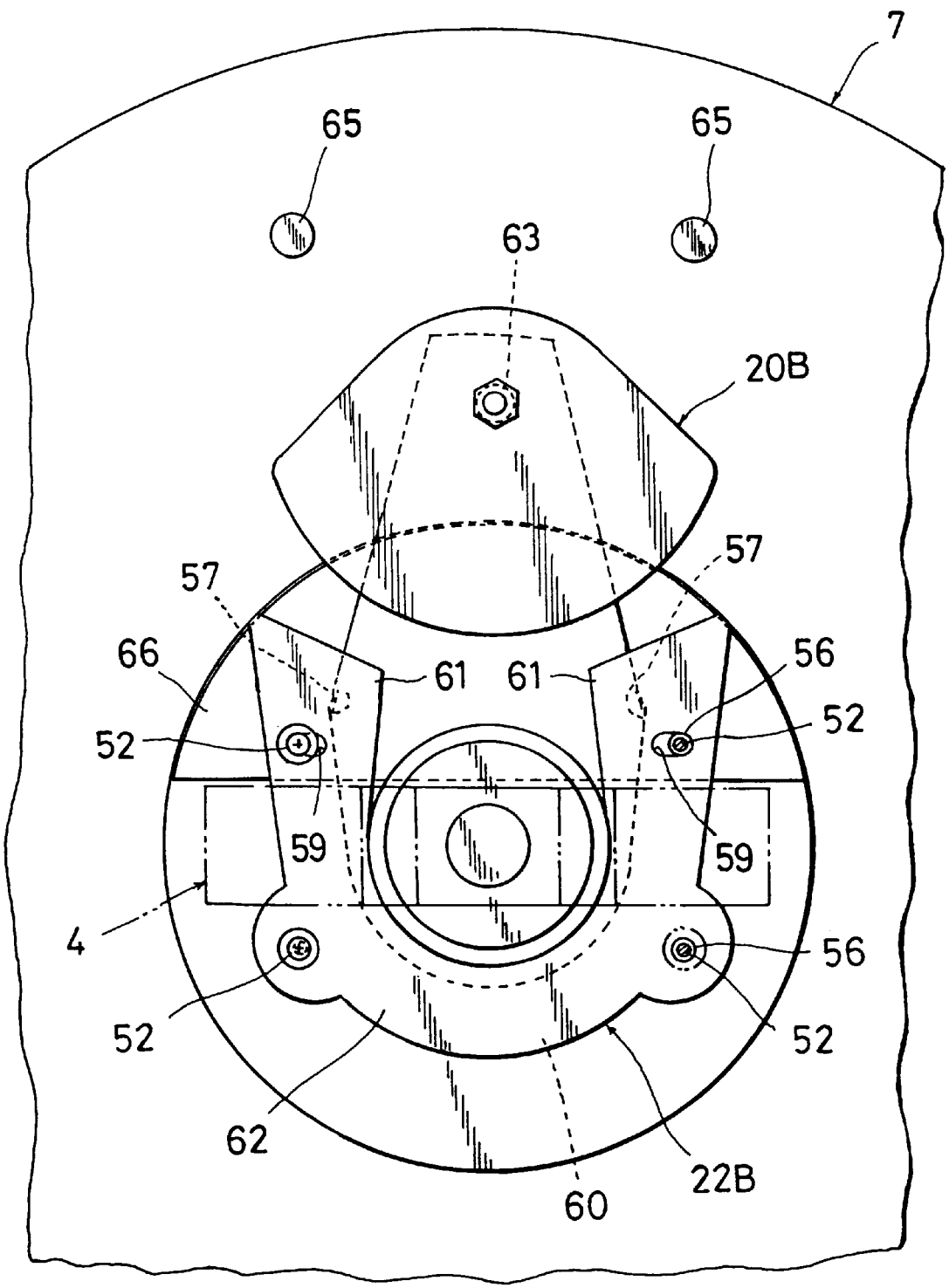
FIG. 71 is an explanation view of a removing condition showing an eighteenth embodiment of the present invention.

Other embdiments of the pesent invention will now be described referring to FIGS. 14 to 71. Through the drawings of the embodiments, like components are denoted by like numerals as of the first embodiment and will not be further explained.

Figure 14:
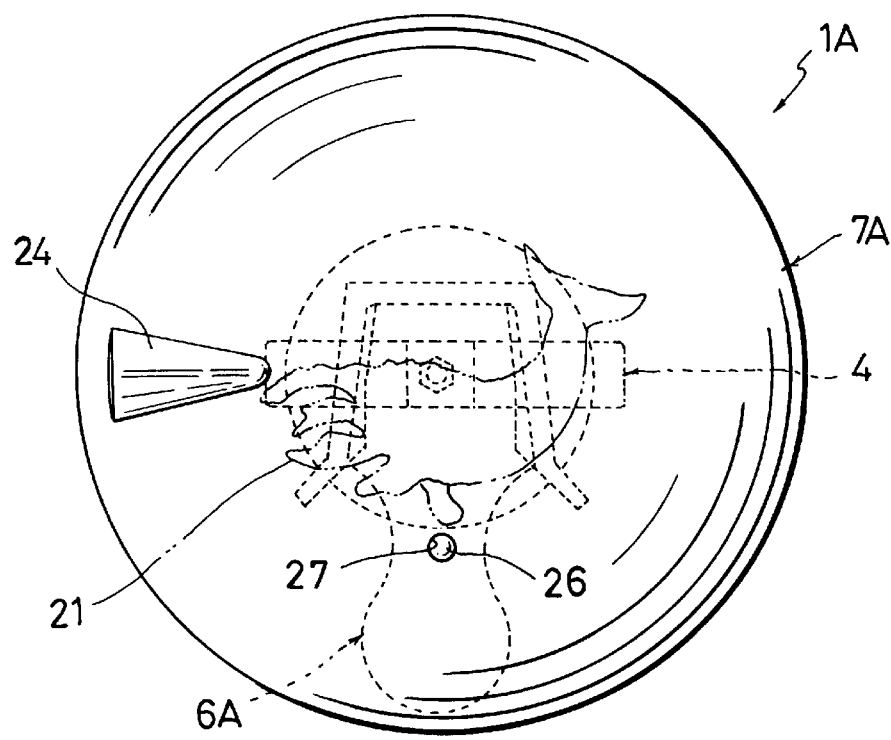
FIG. 14 is a front view showing a second embodiment of the present invention.
Figure 15:
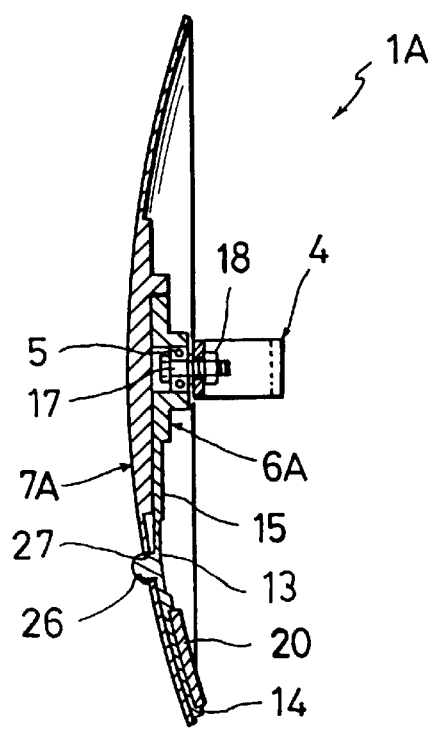
FIG. 15 is a vertical cross-sectional view showing a second embodiment of the present invention.
Figure 16:
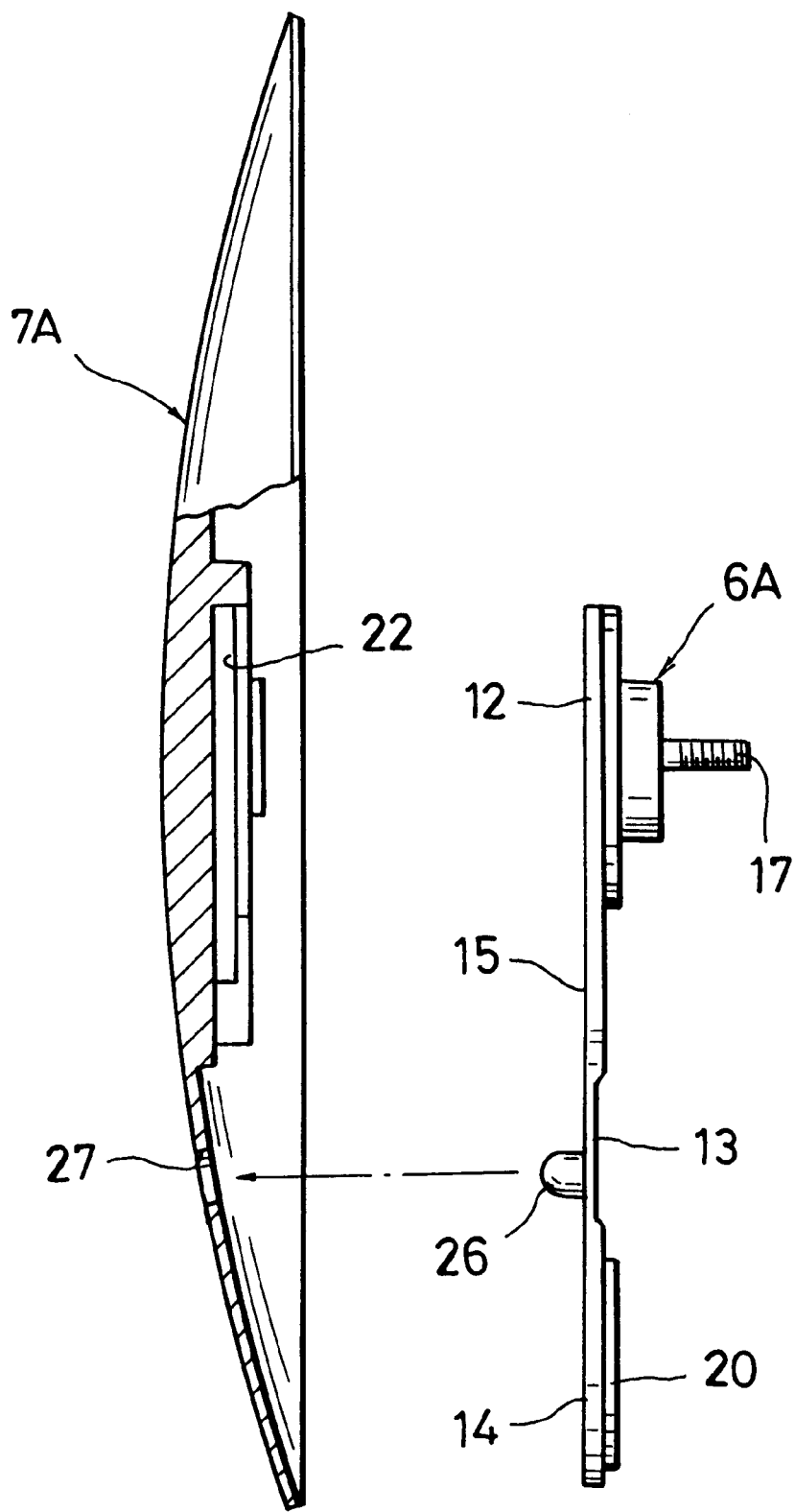
FIG. 16 is an explanation view of a condition separated from a wheel cover body and a movable side fixture.

FIGS. 14 to 16 illustrate a second embodiment of the present invention which is distinguished from the first embodiment by a movable side fixture 6A formed as one of a fitting piece 26 for outer part of the connection 13 and a wheel cover body 7A formed an fitable hole 27 inserted the fitting piece 26 of the movable side fixture 6A when it is fixed. A wheel cover 1A with the movable side fixture 6A and wheel cover body 7A according to the second embodiment will provide the same effects as the first embodiment and the fitting piece 26 can prevent to remove the wheel cover body 7A and movable side fixture 6A in efficiency.

Figure 17:
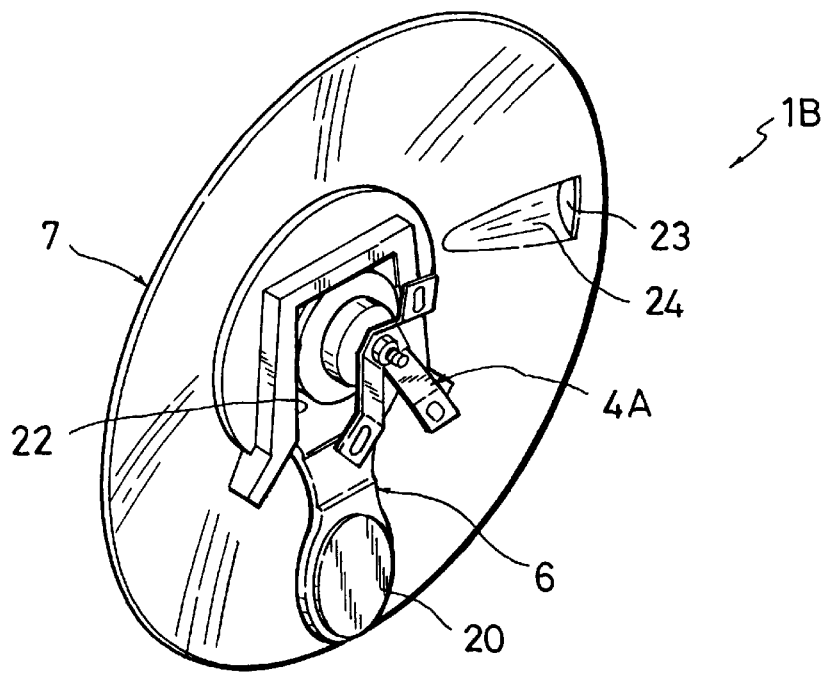
FIG. 17 is a perspective view from a back side showing a third embodiment of the present invention.
Figure 18:
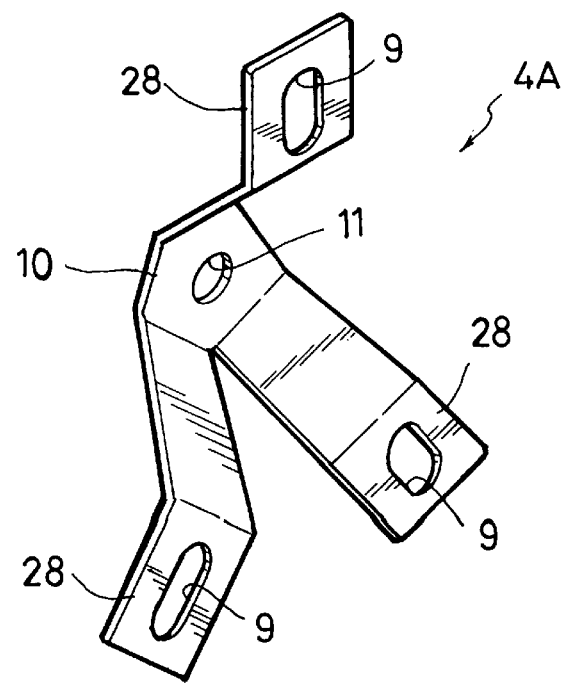
FIG. 18 is a perspective view of a fixable side fixture showing a third embodiment of the present invention.
Figure 19:
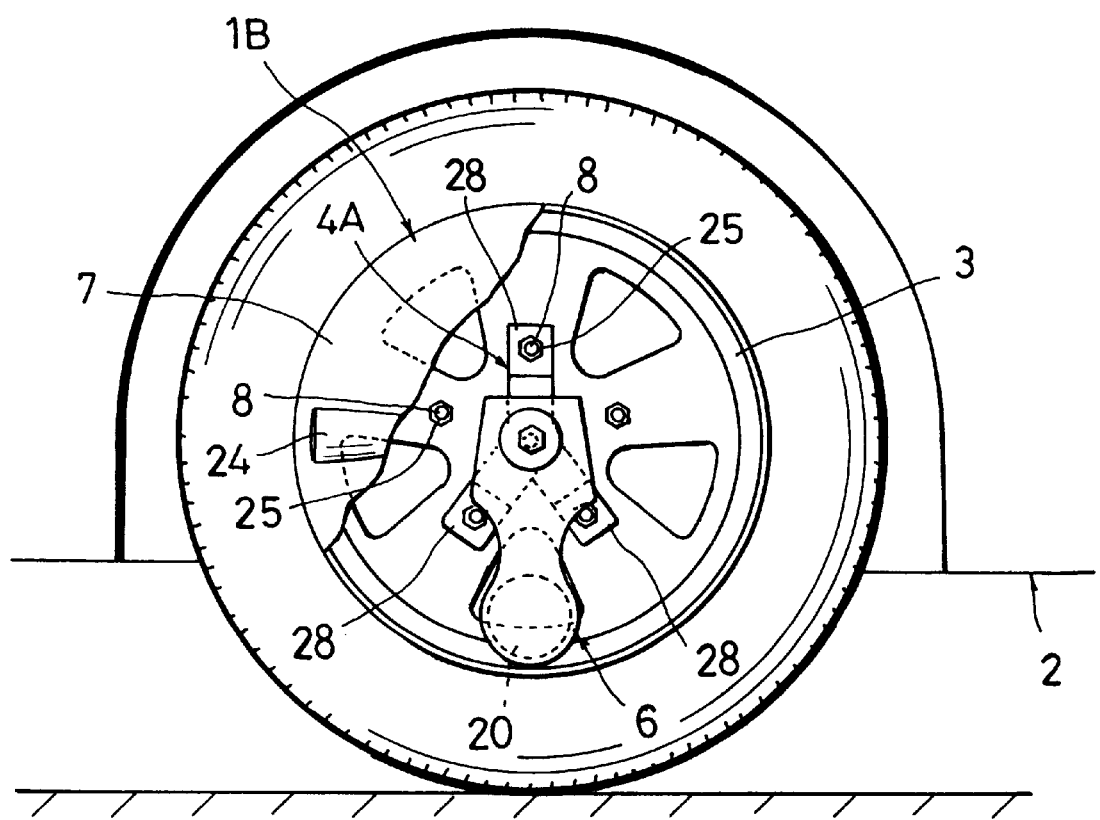
FIG. 19 is a partly cross-sectional front view of a mounted condition showing a third embodiment of the present invention.

FIGS. 17 to 19 illustrate a third embodiment of the present invention which is distinguished from the first embodiment by a fixable side fixture 4A having three legs 28, 28, 28, capable with fixing to the passenger car 2 and is able to fix the wheel 3 with the uneven number of wheel bolts 8. A wheel cover 1B with the fixable side fixture 4B according to the third embodiment will provide the same effects as the first embodiment.

Figure 20:
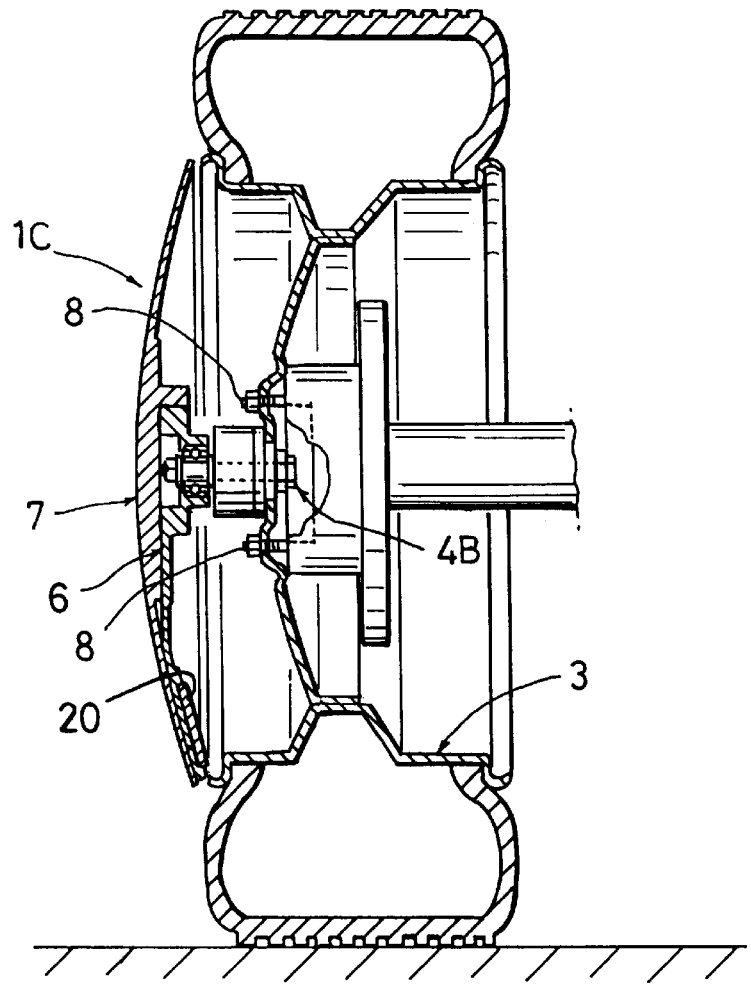
FIG. 20 is a cross-sectional view of a condition during use showing a fourth embodiment of the present invention.
Figure 21:
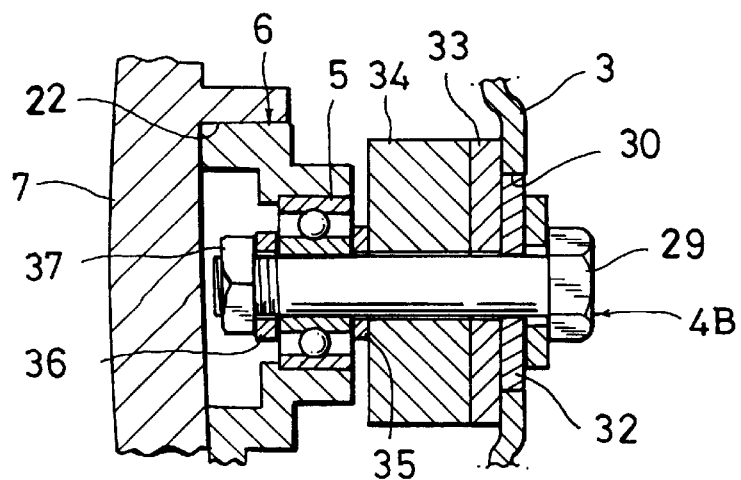
FIG. 21 is a mainly expanded cross-sectional view showing a fourth embodiment of the present invention.
Figure 22:
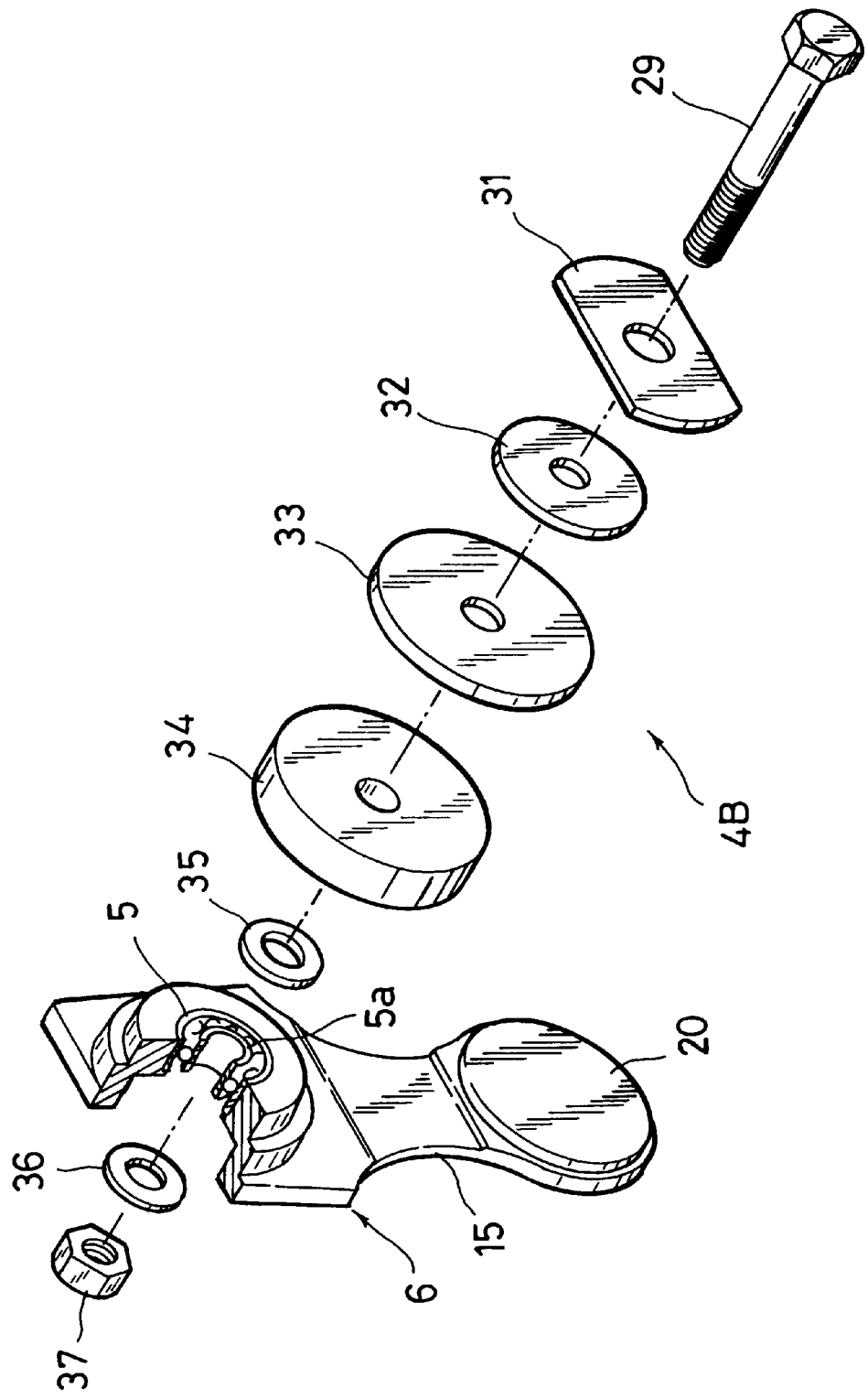
FIG. 22 is a partly cross-sectional exploded perspective view of a fixable side fixture and a movable side fixture.

FIGS. 20 to 22 ilustrate a fourth embodiment of the present invention which is distinguished from the first embodiment by a fixable side fixture 4B comprises a bolt 29, a set board 31, a centering board 34 and the movable side fixture 5 mounted the ball bearing 5 as a bearing having the rotating ring 5a holdably fixed on top part of the bolt 29 of the fixable side fixture 4B with washers 35, 36 and a nut 37. The set board 31 in the shape of an oval or like a race track can be inserted at inner part greater than the place of an axle hole 30, inserted the bolt 29, positioned at the center of the wheel 3 and can set both sides of the center of the wheel 3. The centering board 32 is inserted into the axle hole 30, inserted the bolt 29 to the center part of the wheel 3 and conducts the centering. The spacer 33 and holding board 34 are inserted the bolt 29 in the center thereof. A wheel cover 1C with the fixable side fixture 4B and movable side fixture 6 according to the fourth embodiment will provided the same effects as the first embodiment and the wheel cover 1C can be set to the wheel 3 if the nut 25 of the wheel bolt 8 is removed.

Figure 23:
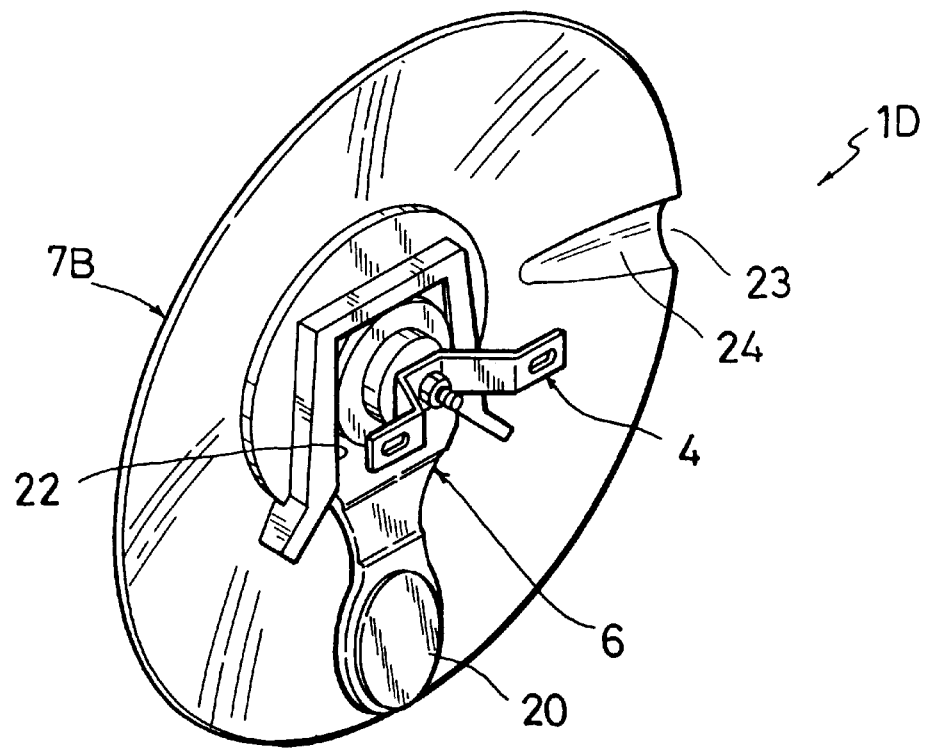
FIG. 23 is a perspective view of a back side showing a fifth embodiment of the present invention.
Figure 24:
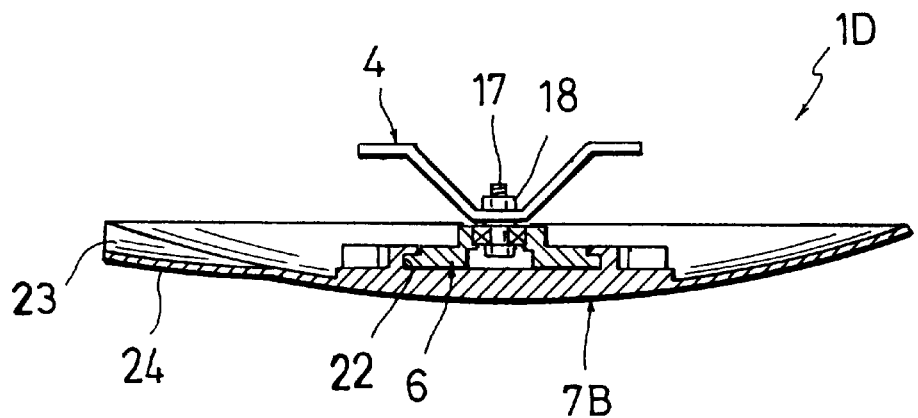
FIG. 24 is a cross-sectional view showing a fifth embodiment of the present invention.
Figure 25:
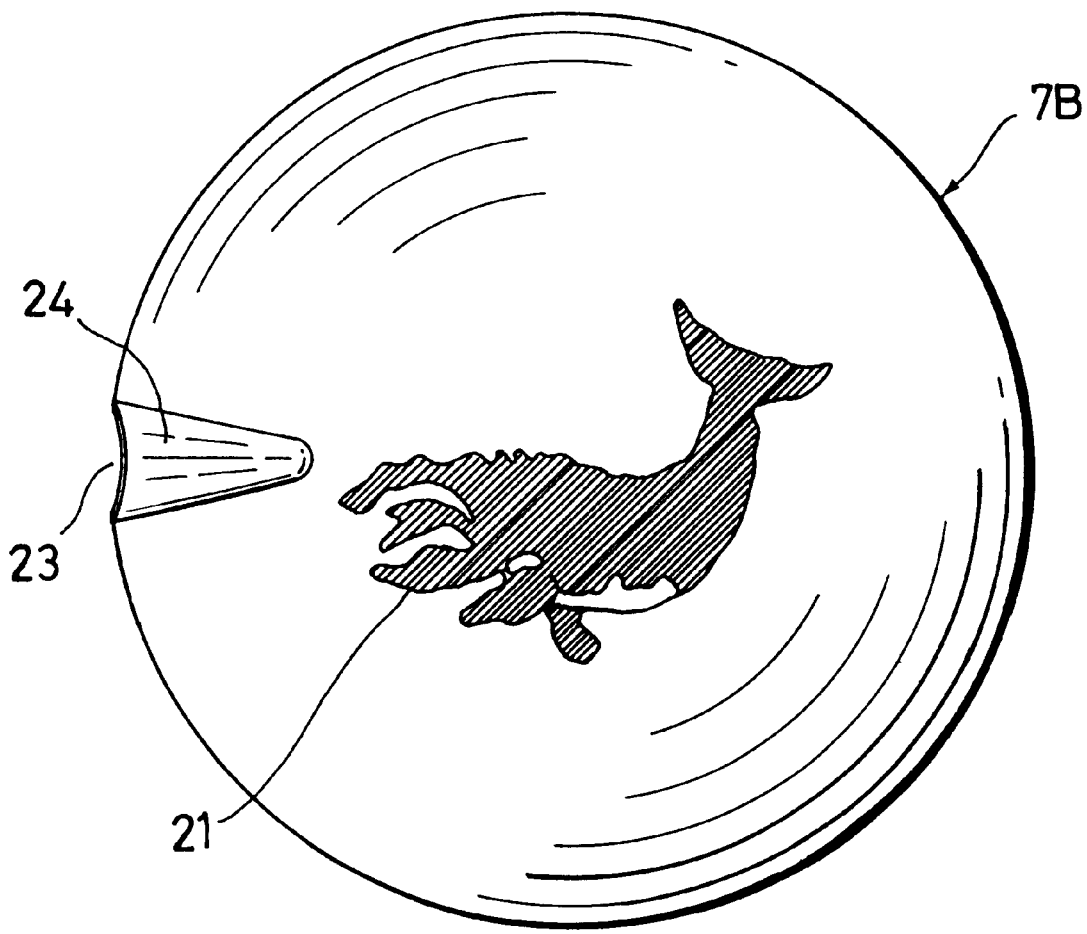
FIG. 25 is a front view of a wheel cover body showing a fifth embodiment of the present invention.

FIGS. 23 to 25 illustrate a fifth embodiment of the pesent invention which is distinguished from the first embodiment by a wheel cover body 7B formed the air current guide part 24 is able to form the air efflux 23 to the end thereof. A wheel cover 1D with the wheel cover body 7B formed of the air current guide part 24 according to the fifth embodiment will provide the same effects as the first embodiment.

Figure 26:
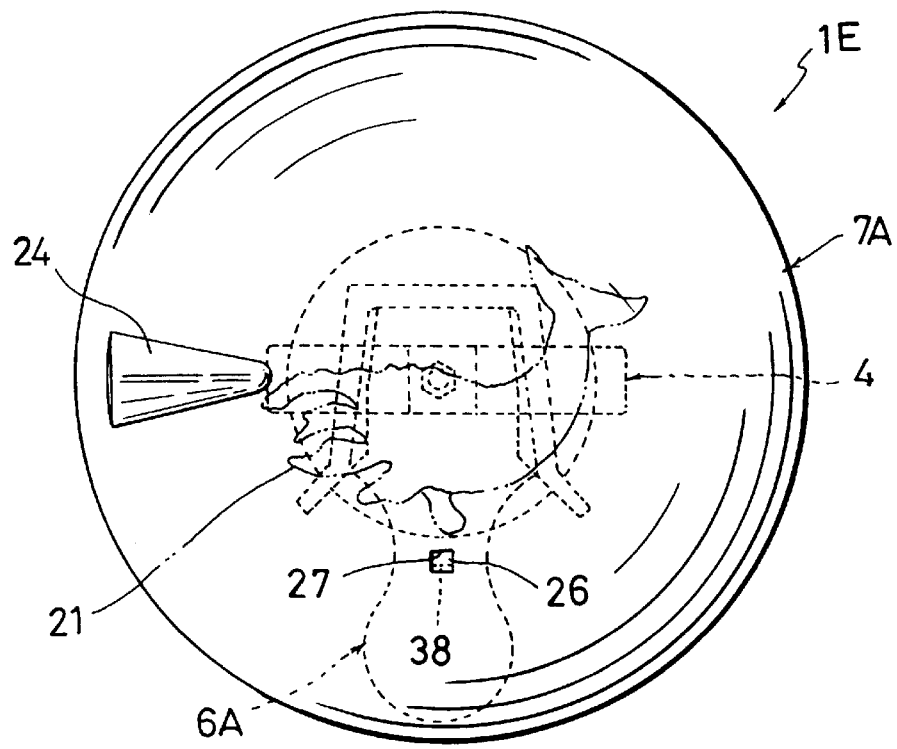
FIG. 26 is a front view showing a sixth embodiment of the present invention.
Figure 27:
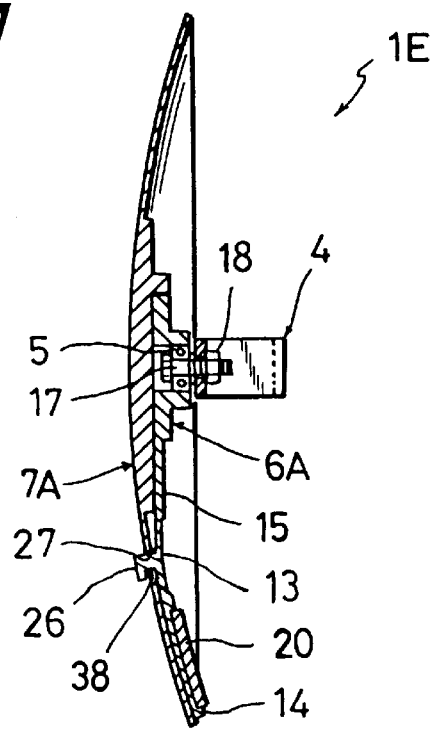
FIG. 27 is a cross-sectional view showing a sixth embodiment of the present invention.
Figure 28:
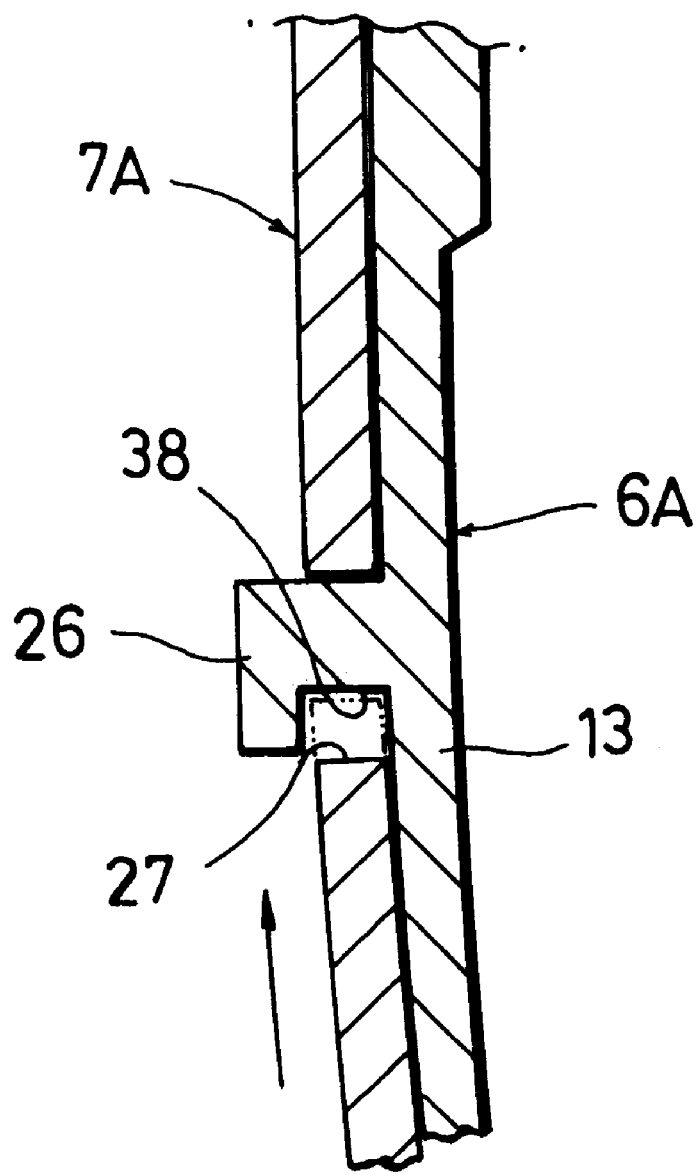
FIG. 28 is a mainly expanded cross-sectional view showing a sixth embodiment of the present invention.

FIGS. 26 to 28 illustrate a sixth embodiment of the pesent invention which is distinguished from the second embodiment by a wheel cover 1E having a structure that the end of the fitable hole 27 can creep in a set gap 38 formed in the fitting piece 26, capable of preventing to move the wheel cover body 7A when the wheel cover body 7A move the direction of moving way under the condition that the fitting piece 12 of the movable side fixture 6A engages the fitting part 22 of te two wheel cover body 7A. The wheel cover 1E according to the sixth embodiment will provide the same effects as the second embodiment and part of edge of the fitable hole 27 creeps in the set gap 38 of the fitting piece 26 with the movable side fixture 6A if hte wheel cover body 7A removes due to be out of order so that the wheel cover body 7A can be prevented certainly to remove.

Figure 31:
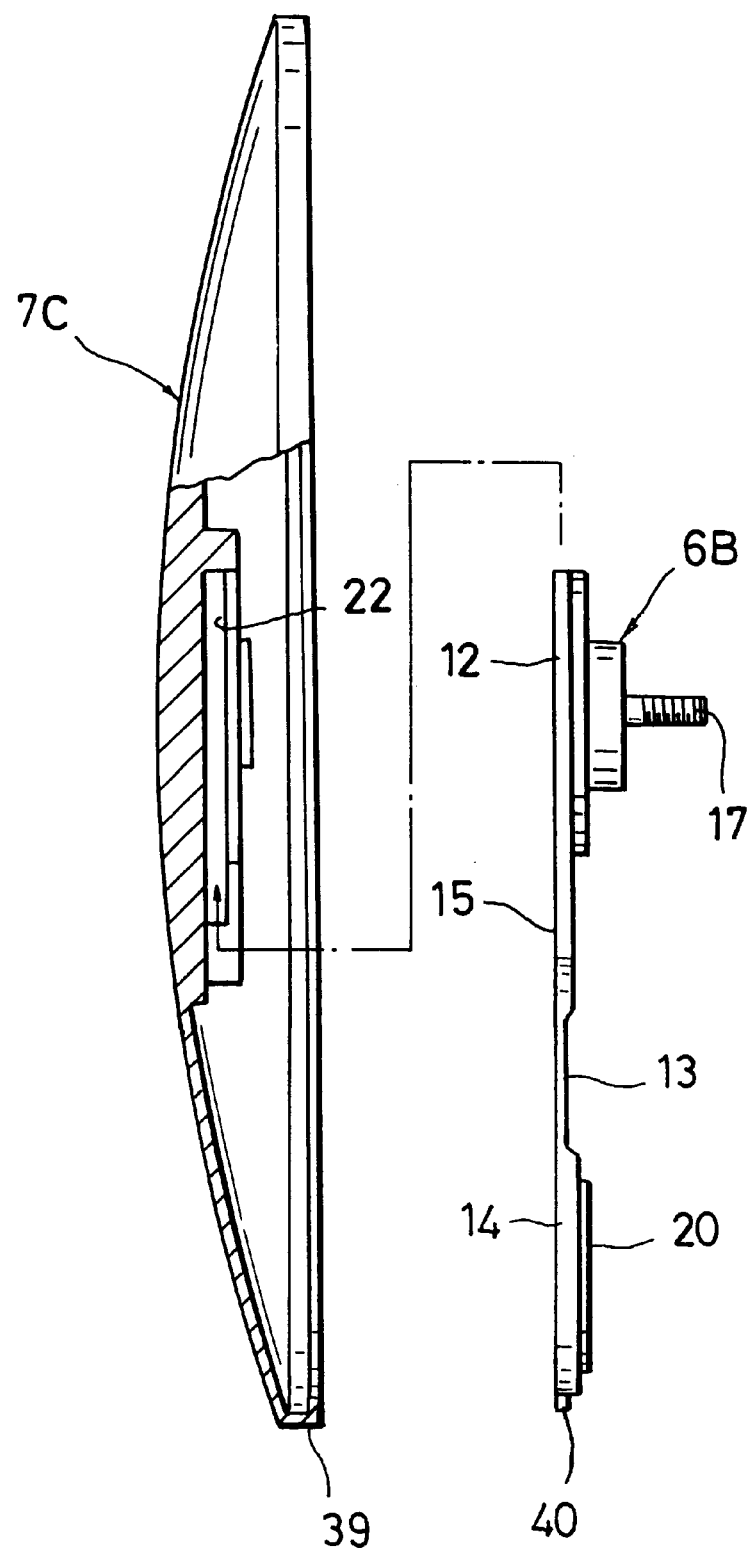
FIG. 31 is a partly cross-sectional explanation view separated from a wheel cover body and a movable side fixture.

FIGS. 29 to 31 illustrate a seventh embodiment of the pesent invention which is distinguished from the first embodiment by a wheel cover body 7C formed a flange 39 bended inside part of outer edge thereofand a movable side fixture 6B formed an engagement 40 which can engage with the flange 39 of the wheel cover body 7C when the wheel cover body 7C is mounted to the lower part of the movable side fixture 15. A wheel cover 1F according to the seventh embodiment will provide the same effects as first embodiment and the moving to the direction of removing of the the wheel cover body 7C can be prevented because the engagement 40 of the movable side fixture 6B can engage with the flange 39 of the wheel cover body 7C.

Figure 32:
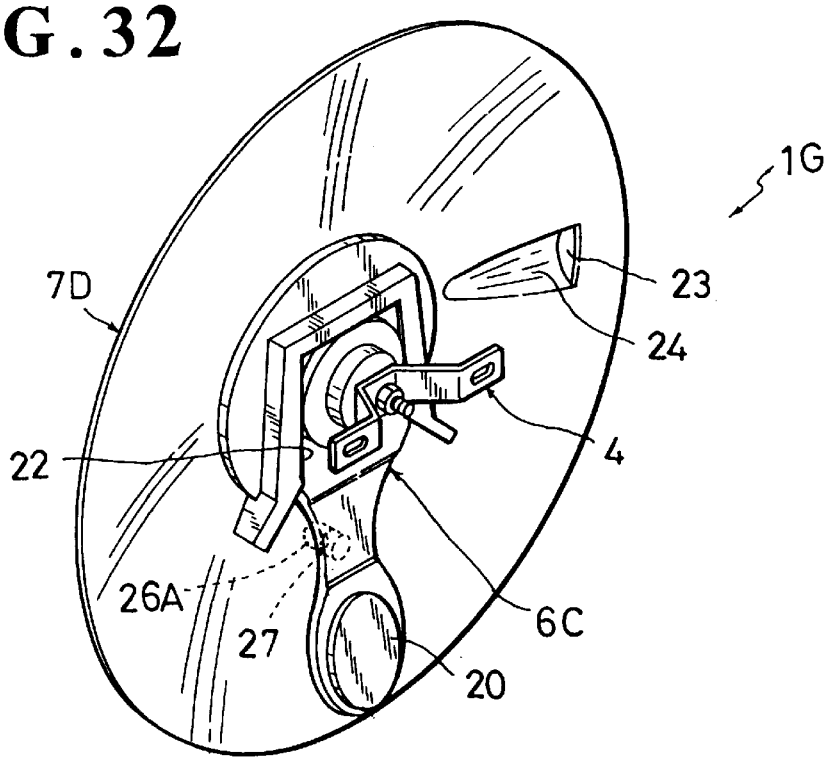
FIG. 32 is a perspective view of back side showing an eighth embodiment of the present invention.
Figure 33:
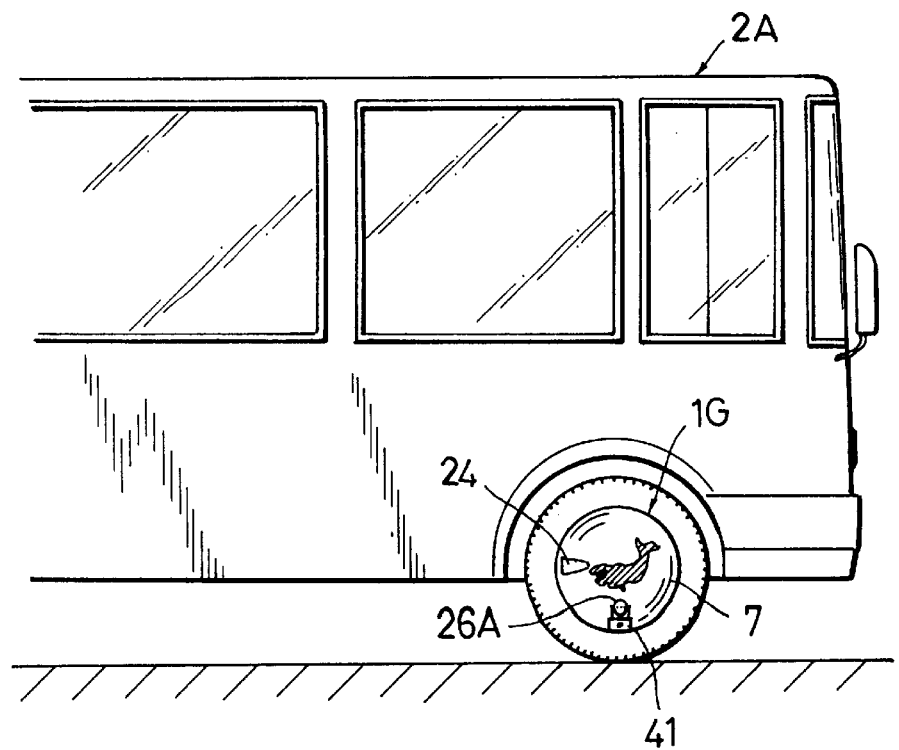
FIG. 33 is an explanation view of a condition during use showing an eighth embodiment of the present invention.
Figure 34:
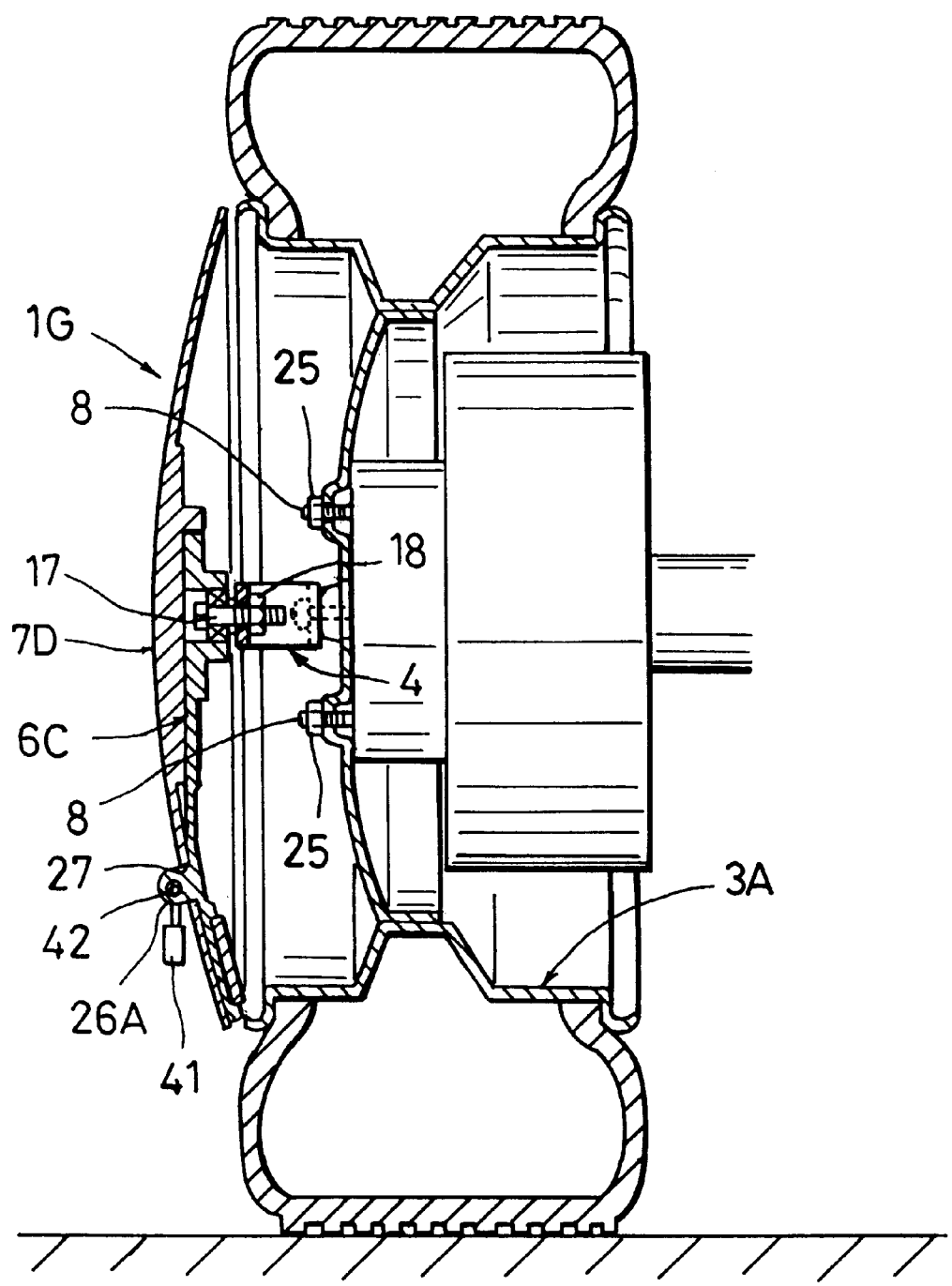
FIG. 34 is a perspective view of a condition during use showing an eighth embodiment of the present invention.

FIGS. 32 to 34 illustrate an eighth embodiment of the pesent invention which is distinguished from the first embodiment by a wheel cover 1G comprises the fixable side fixture 4, a fitting piece 26A formed an insertable hole 42 for mounting of a lock 41, inserted in the fitable hole 27 formed the part of the nearly outer part of the wheel cover body 7D, to the weight supporting part 14 of the movable side side fixture 6C. The above-mentioned wheel cover 1G can prevent certainly to remove the wheel cover body 7D rom the movable side fixture 6C because the fitting piece 26A of the movable side fixture 6C can insert into the fitable hole 27 of the wheel cover body 7D.

Moreover, as illustartes FIG. 34, it can be certainly pevented tobe stolen the wheel cover body 7D because of the mounting the lock 41 to the insertable hole 42 of the fitting piece 26A.

Figure 35:
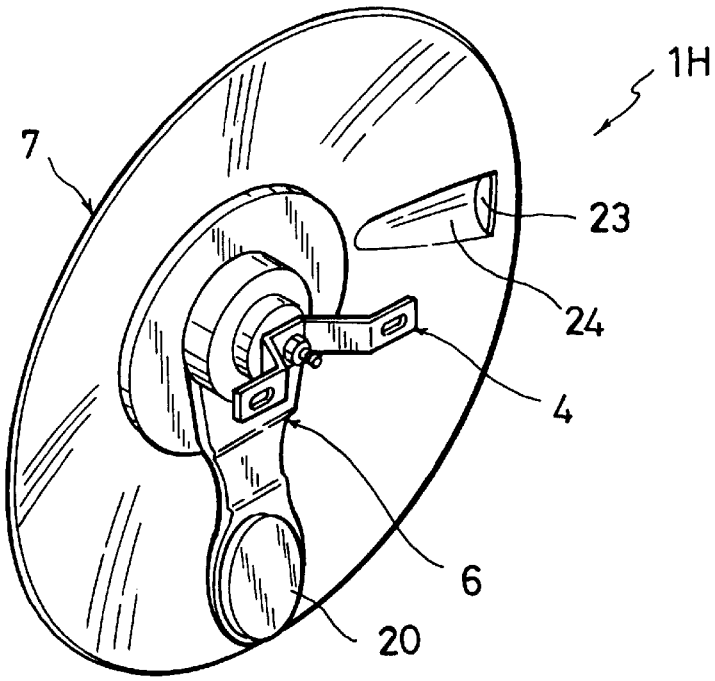
FIG. 35 is a perspective view of a back side showing a ninth embodiment of the present invention.
Figure 36:
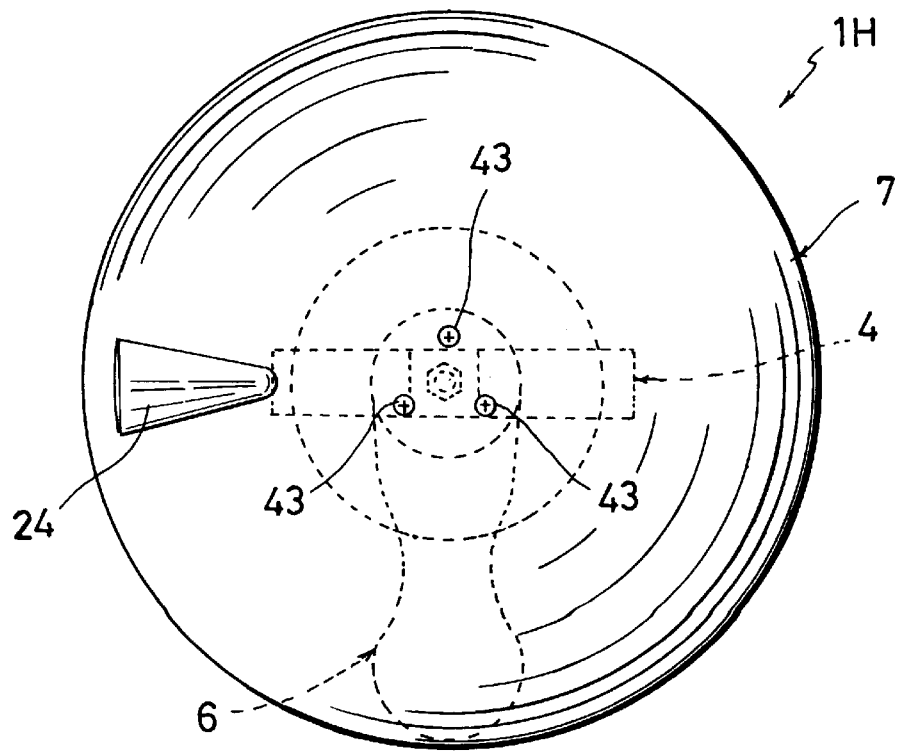
FIG. 36 is a front view showing a ninth embodiment of the present invention.
Figure 37:
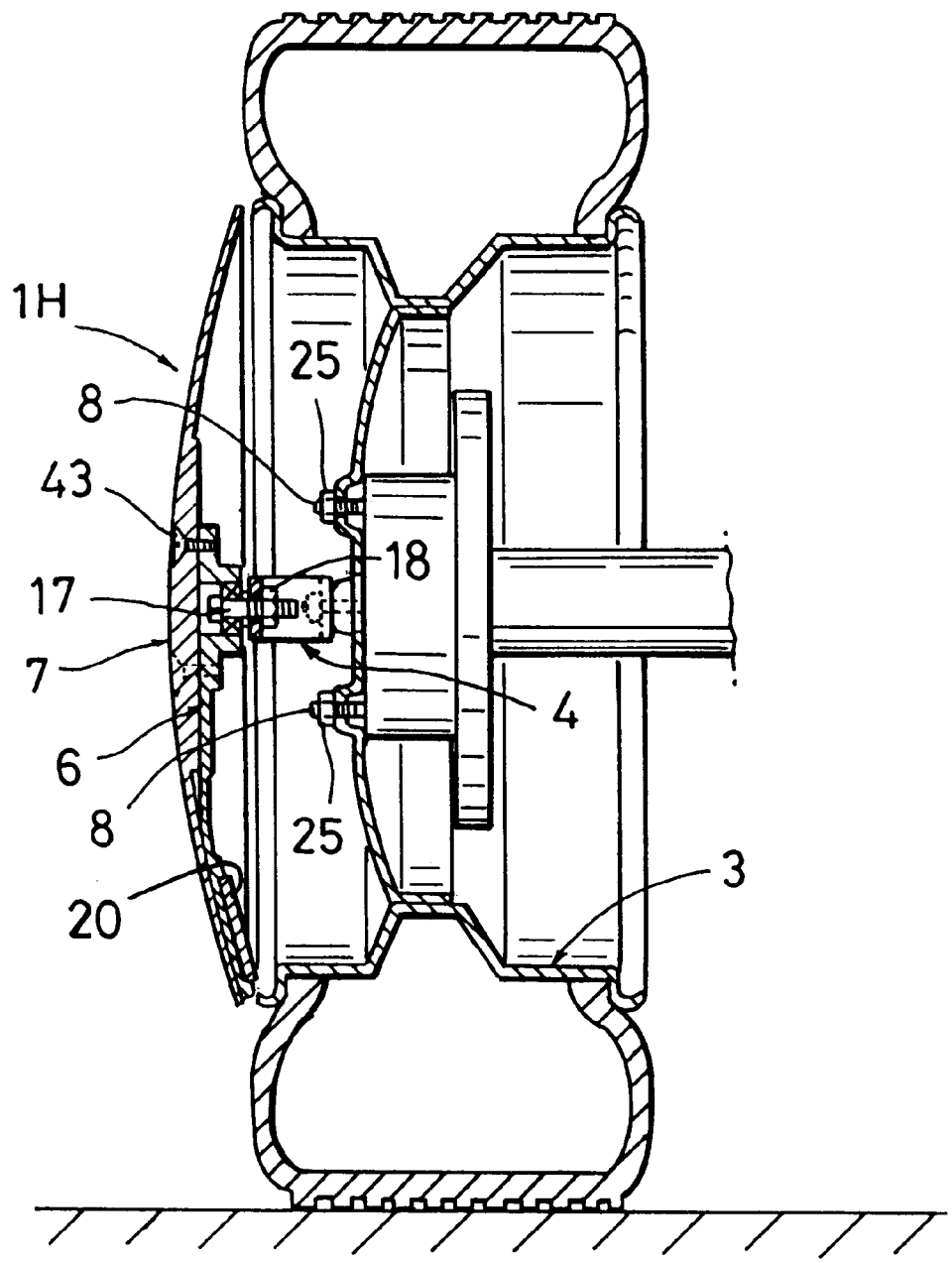
FIG. 37 is a cross-sectional view of a condition during use showing a ninth embodiment of the present invention.

FIGS. 35 to 37 illustrate a ninth embodiment of the pesent invention which is distinguished from the first embodiment by the mounting the movable side fixture 6 and the wheel cover body 7 with a multiplicity of, three of screws 43 is elected in this embodiment. A wheel cover 1H accoding to the ninth embodiment will provide the same effects as the first embodiment.

Figure 38:
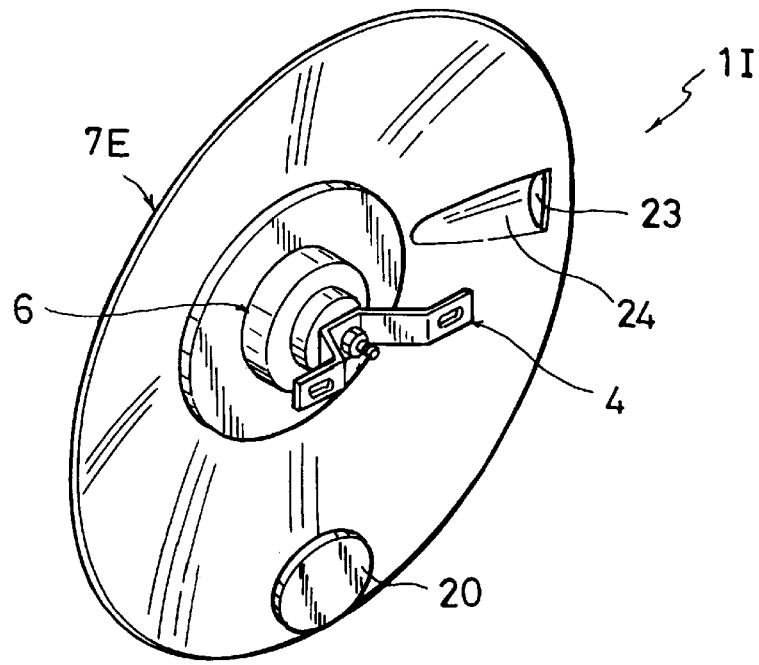
FIG. 38 is a perspective view of back side showing a tenth embodiment of the present invention.
Figure 39:
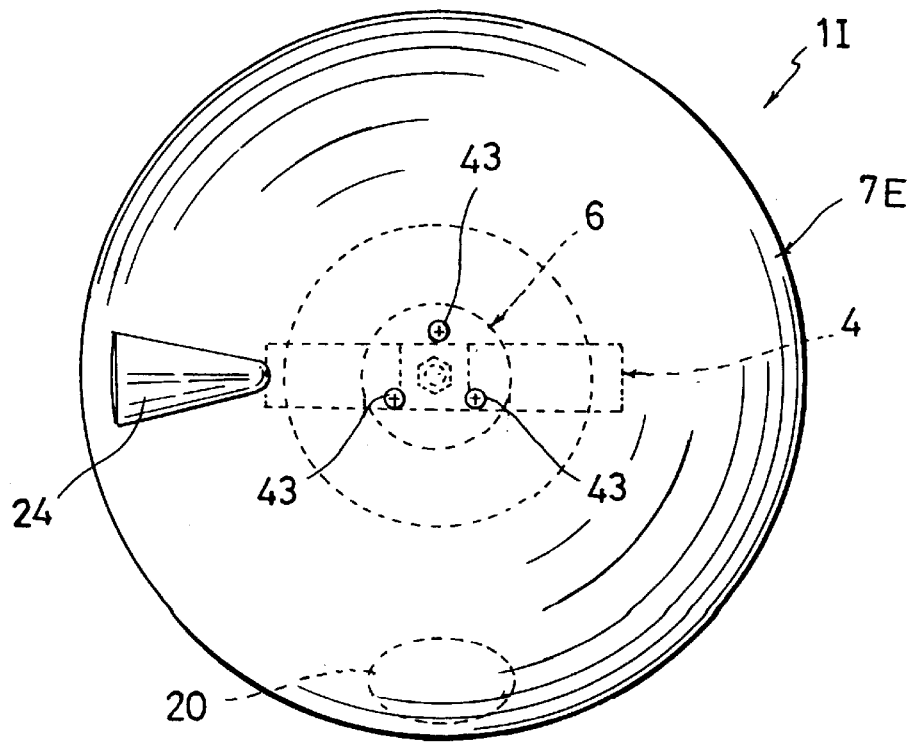
FIG. 39 is a front view showing a tenth embodiment of the present invention.
Figure 40:
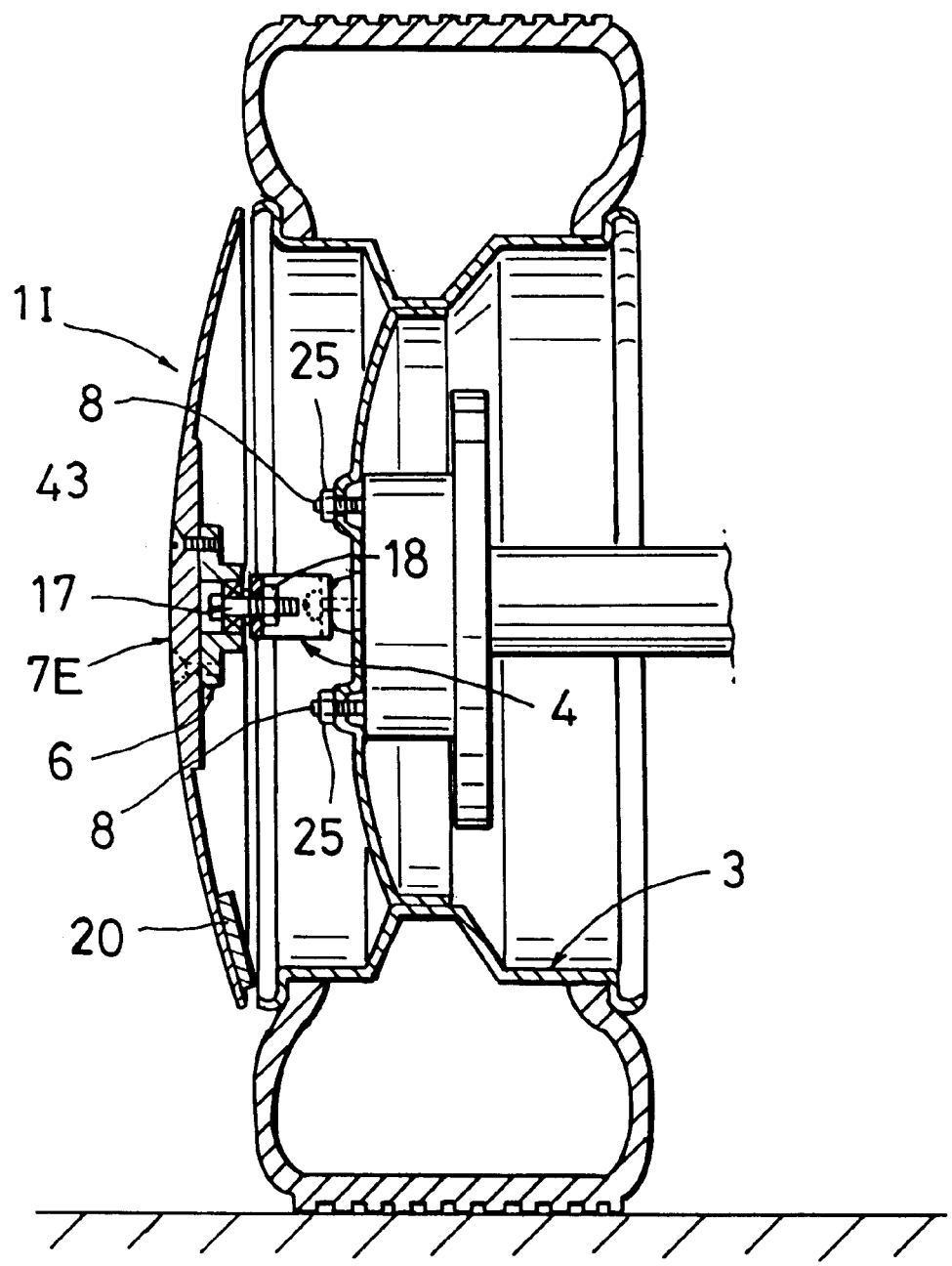
FIG. 40 is a cross-sectional view of a condition during use showing a tenth embodiment of the present invention.

FIGS. 38 to 40 illustrate a tenth embodiment of the pesent invention which is distinguished from the ninth embodiment by a wheel cover body 7E having the weight 20 fixed with screw, adhesive, or weld at the lower part of the back face thereof. A wheel cover 1I with the wheel cover body 7E accoding to the tenth embodiment will provide the same effects as the ninth mbodiment.

Figure 41:
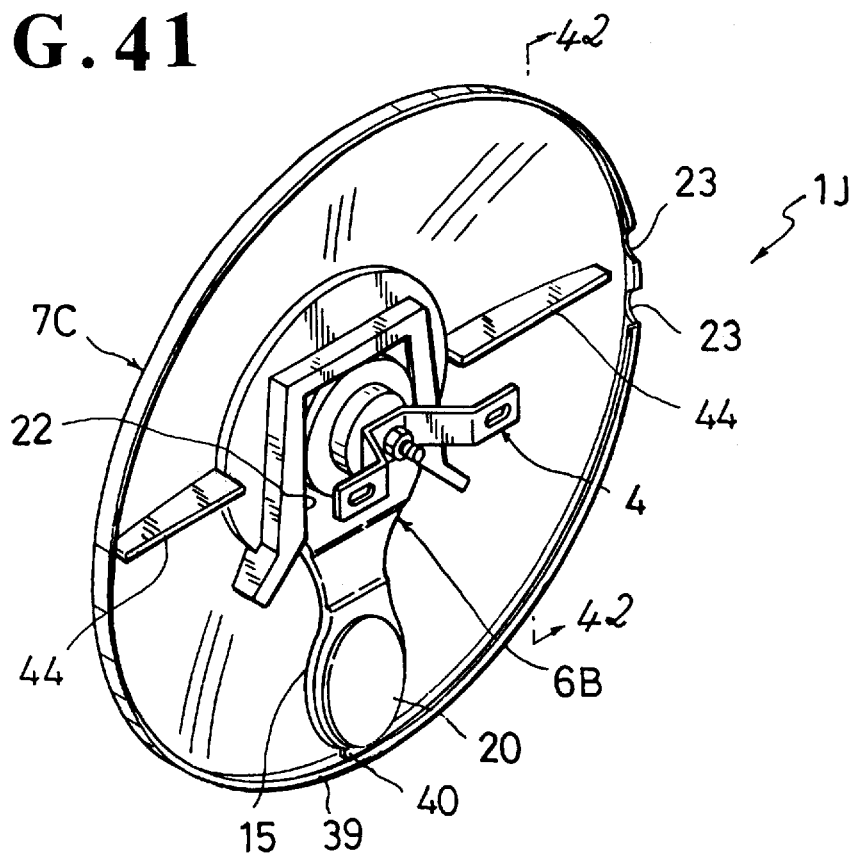
FIG. 41 is a perspective view of back side showing an eleventh embodiment of the present invention.
Figure 42:
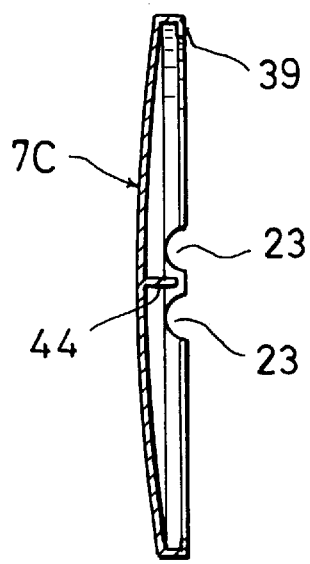
FIG. 42 is a cross-sectional view of a wheel cover body showing an eleventh embodiment of the present invention.
Figure 43:
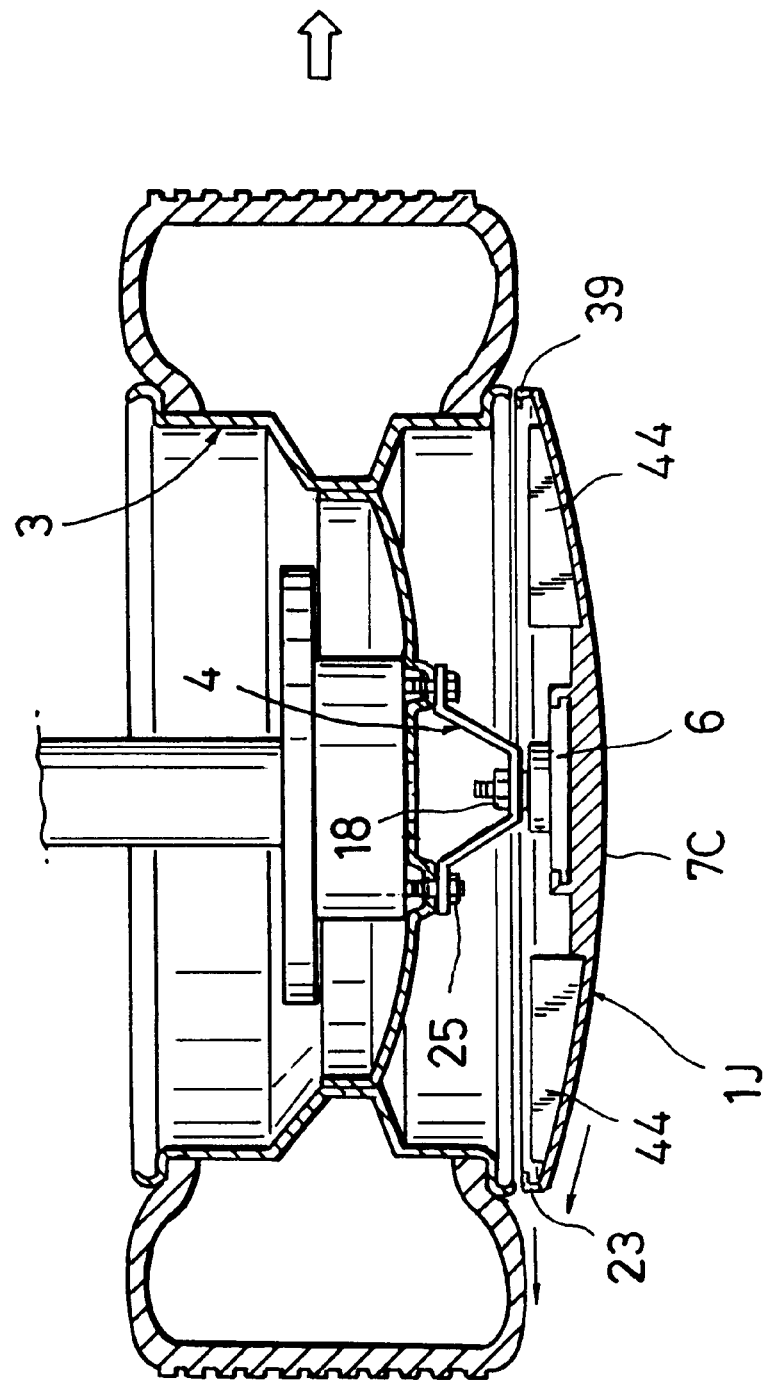
FIG. 43 is a cross-sectional view of a condition during use showing an eleventh embodiment of the present invention.

FIGS. 41 to 43 illustrate an eleventh embodiment of the pesent invention which is distinguished from the seventh embodiment by a wheel cover body 7C formed the air effluxs 23, 23 at the backward thereof and reinforcement boards 44, 44 formed to the front and backward of the direction to the center of back of the wheel cover body 7C accoding to the eleventh embodiment will provide the same effects as the seventh embodiment.

Figure 44:
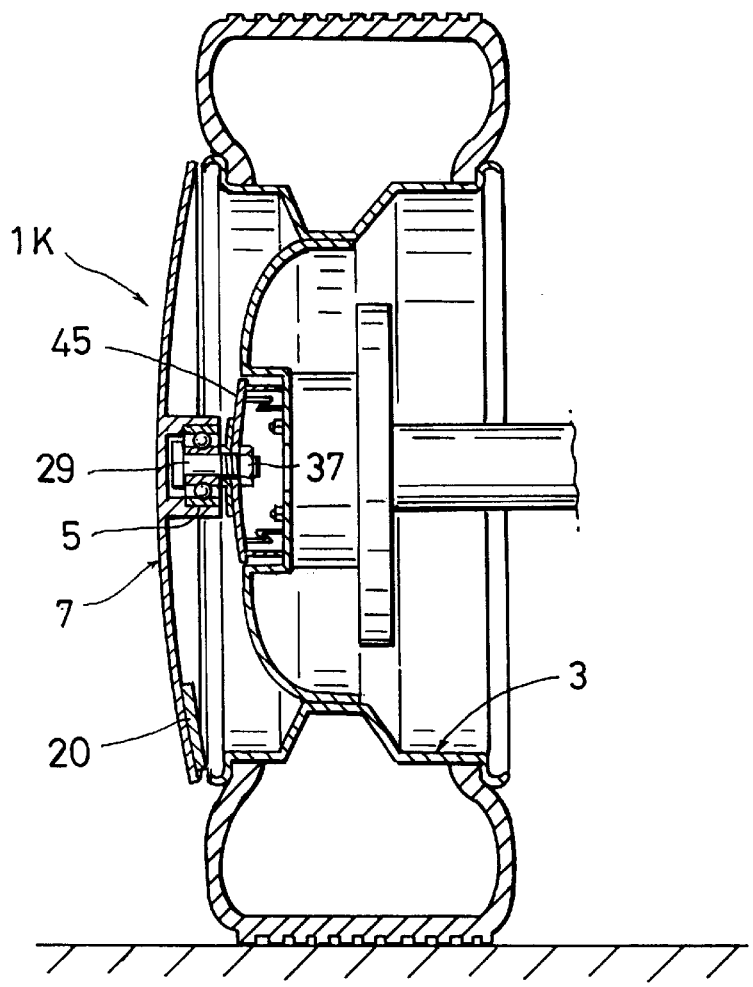
FIG. 44 is a cross-sectional view of a condition during use showing a twelfth embodiment of the present invention.
Figure 45:
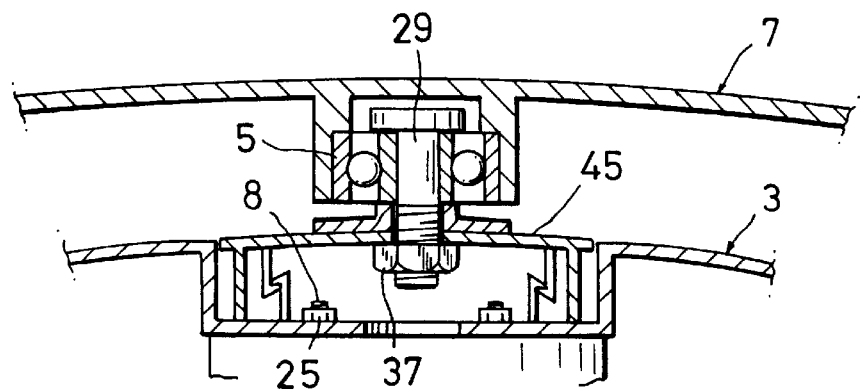
FIG. 45 is a mainly expanded cross-sectional view showing a twelfth embodiment of the present invention.
Figure 46:
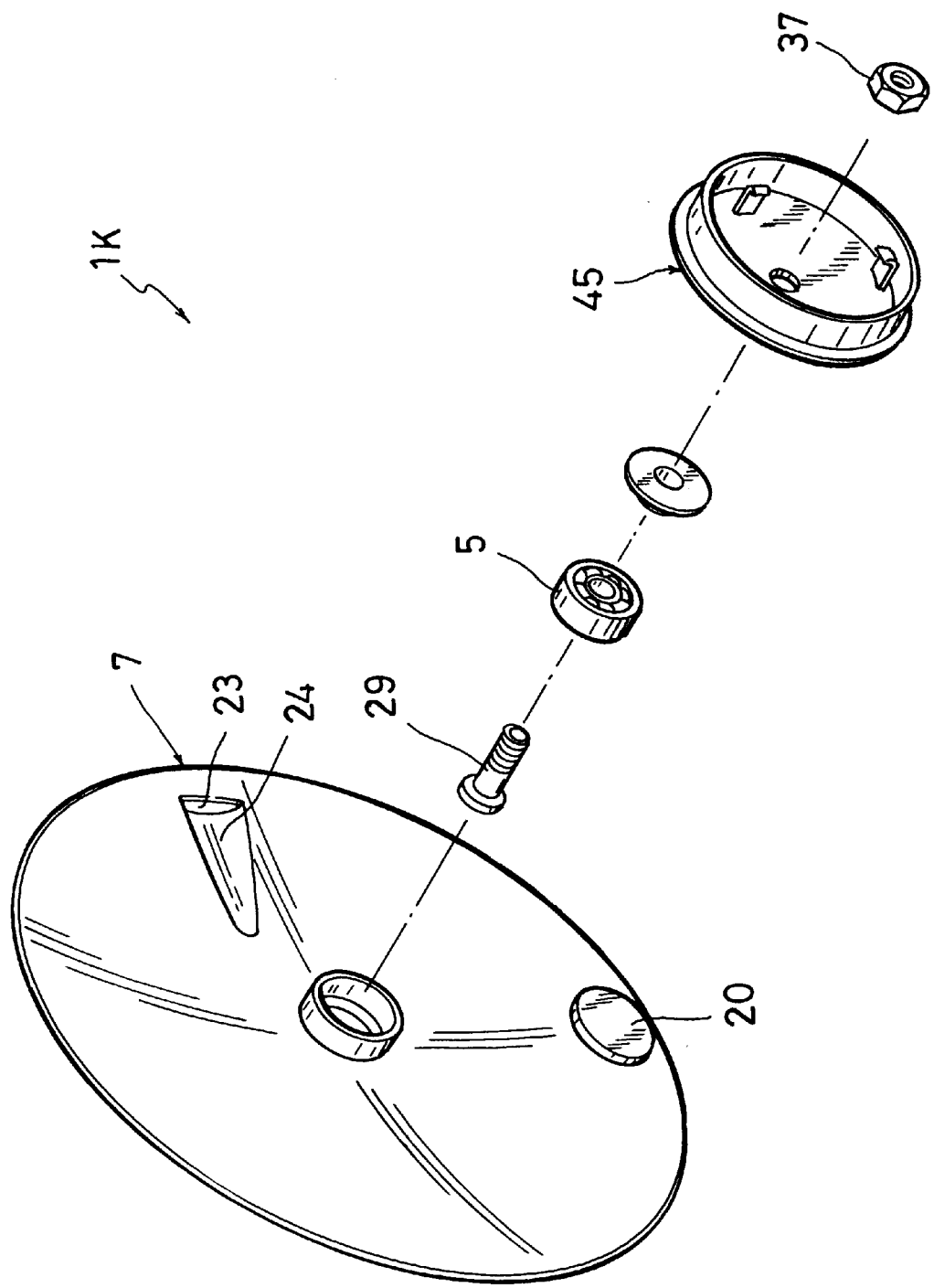
FIG. 46 is an exploded perspective view showing a twelfth embodiment of the present invention.

FIGS. 44 to 46 illustrate a twelfth embodiment of the pesent invention which is distinguished from the first embodiment by the wheel cover body 7 mounted to the wheel bolt cover 45 covering only the part of the wheel bolt 8 of he wheel 3 through the ball bearing 5 as a bearing with the bolt 29 and nut 37, and the weight 20 fixed to the lower part of the back of the wheel cover body 7. A wheel cover 1K accroding to the twelfth embodiment will provide the same effects as the first embodiment.

Moreover, in this embodiment, the fixing structue of the wheel bolt cover 45 and wheel cover body 7 is available to use any structures rotatable mounted the wheel cover body 7.

Figure 47:
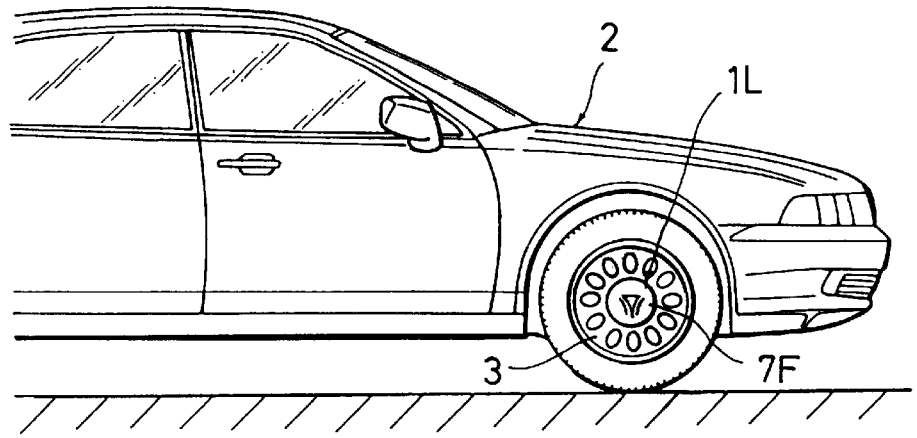
FIG. 47 is an explanation view of a using condition showing a thirteenth embodiment of the present invention.
Figure 48:
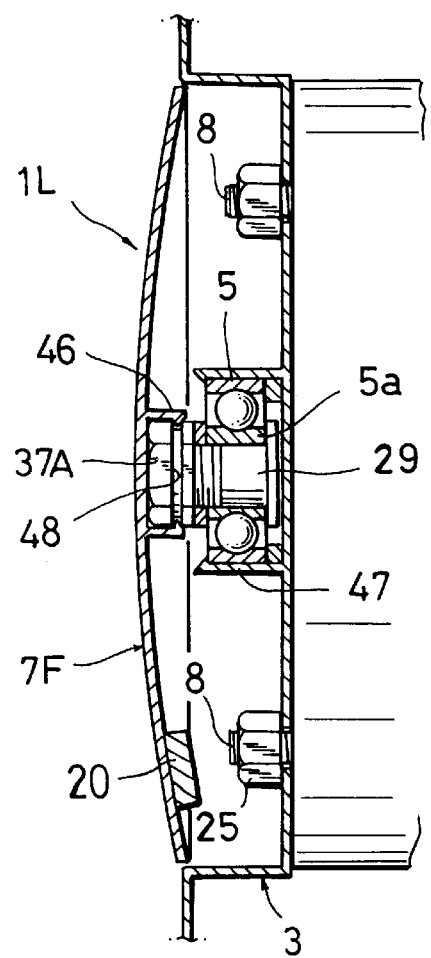
FIG. 48 is a cross-sectional view of a condition during use showing a thirteenth embodiment of the present invention.
Figure 49:
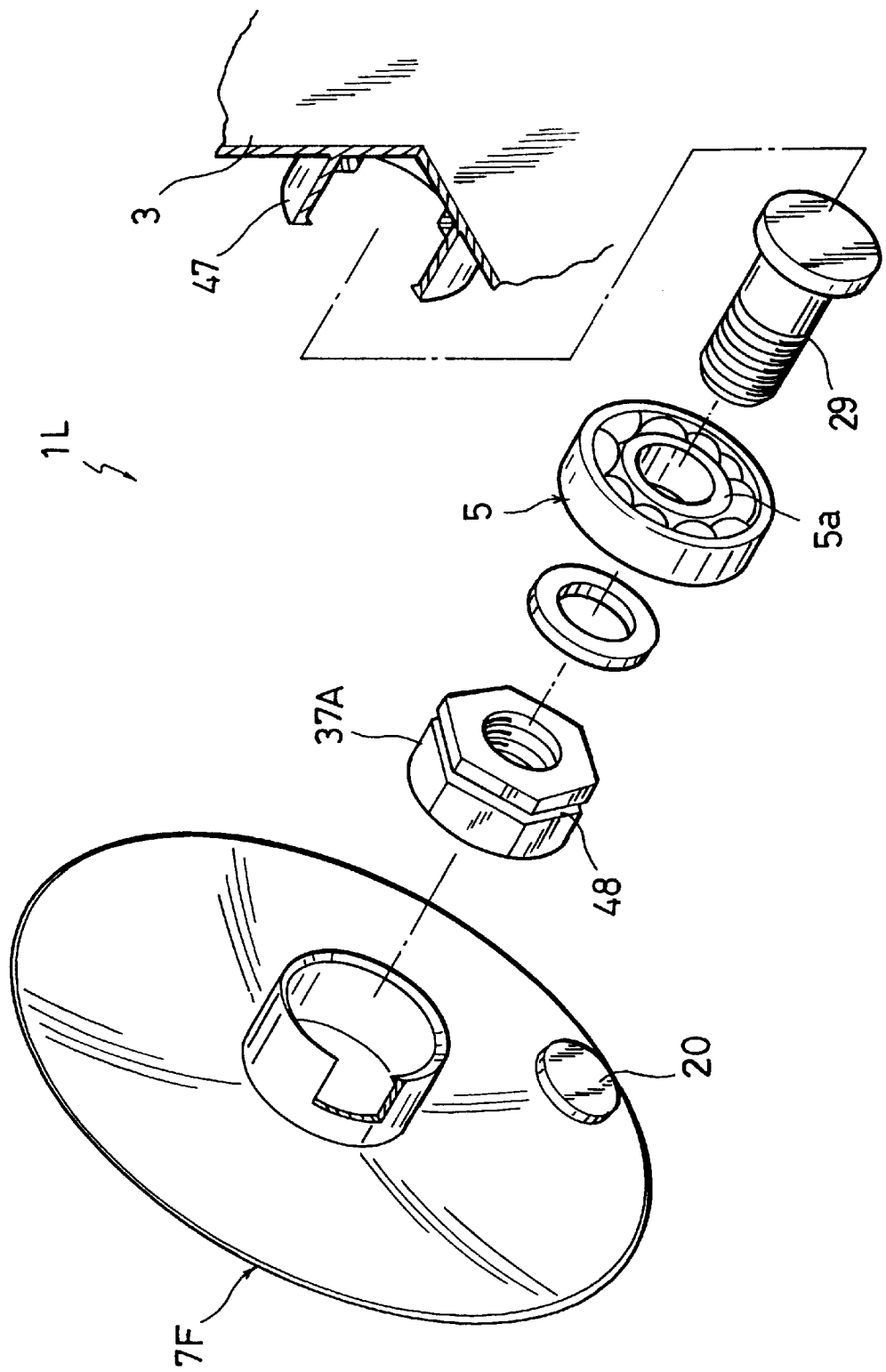
FIG. 49 is a partly cross-sectional exploded perspective view showing a thirteenth embodiment of the present invention.
Figure 52:
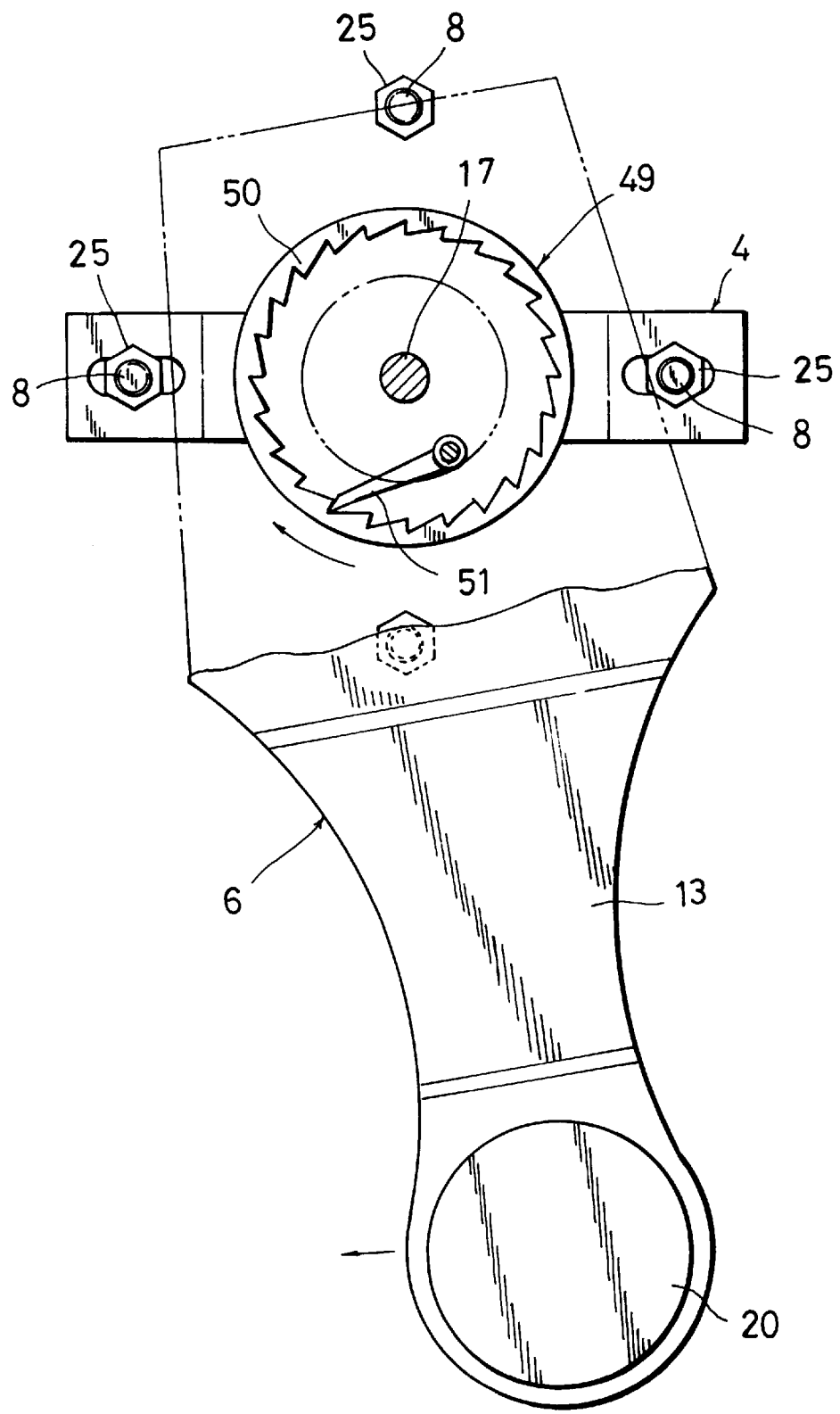
FIG. 52 is an explanation view of a nonreturn protection showing a fourteenth embodiment of the present invention.
Figure 53:
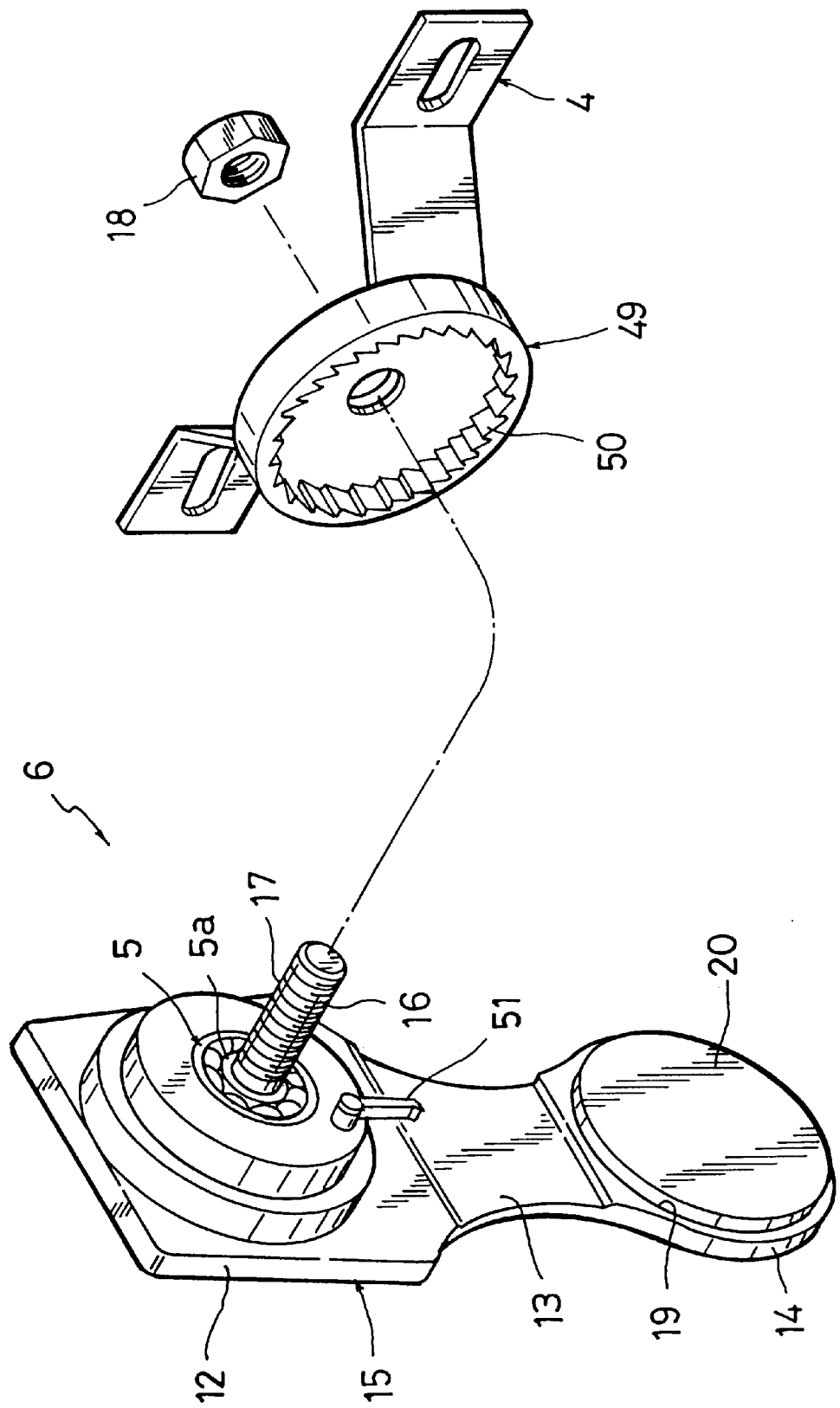
FIG. 53 is a exploded view for explanation about a nonreturn protection showing a fourteenth embodiment of the present invention.
Figure 54:
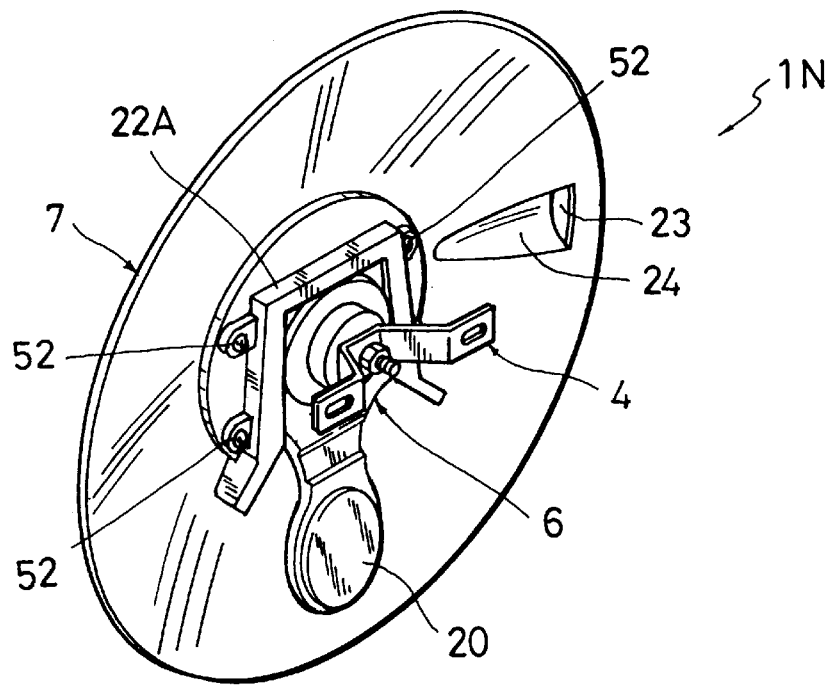
FIG. 54 is a perspective view of back side showing a fifteenth embodiment of the present invention.
Figure 55:
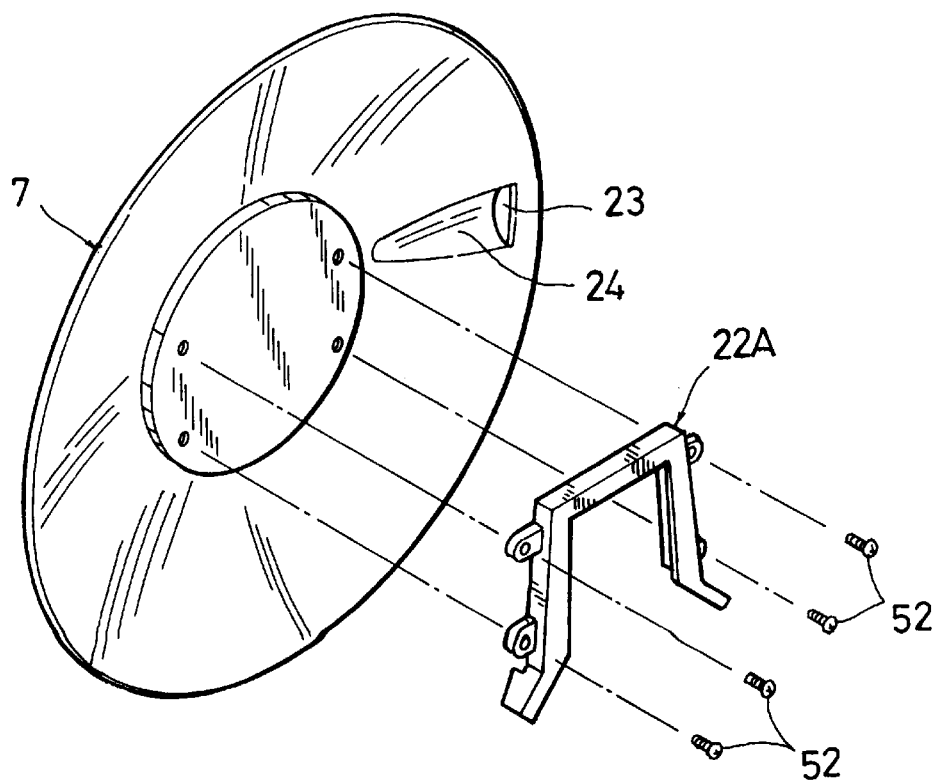
FIG. 55 is an explanation view of a fitting member showing a fifteenth embodiment of the present invention.
Figure 56:
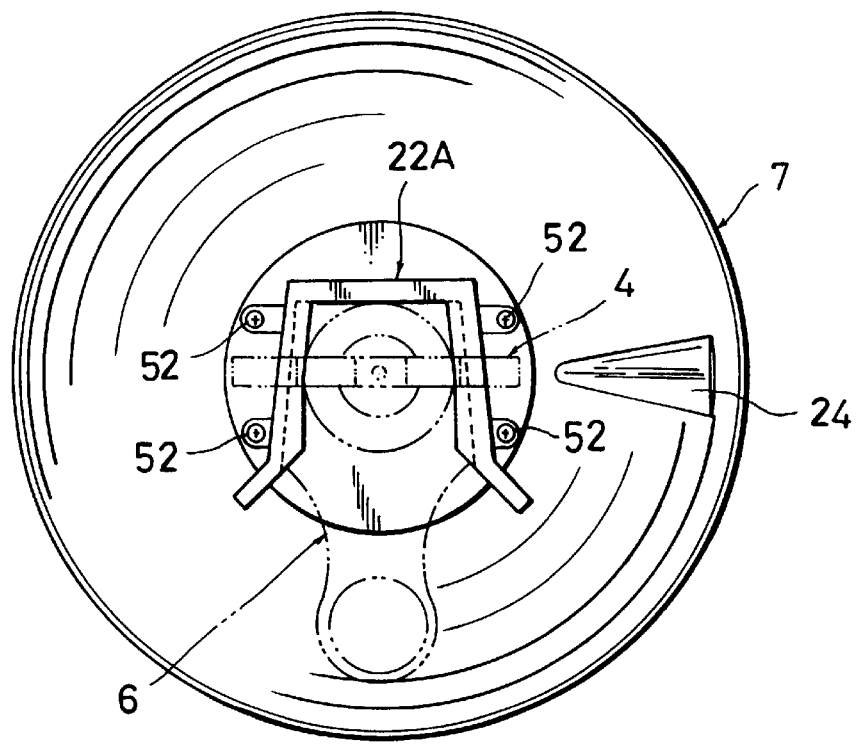
FIG. 56 is an explanation view about a mounted condition of a fitting member showing a fifteenth embodiment of the present invention.
Figure 57:
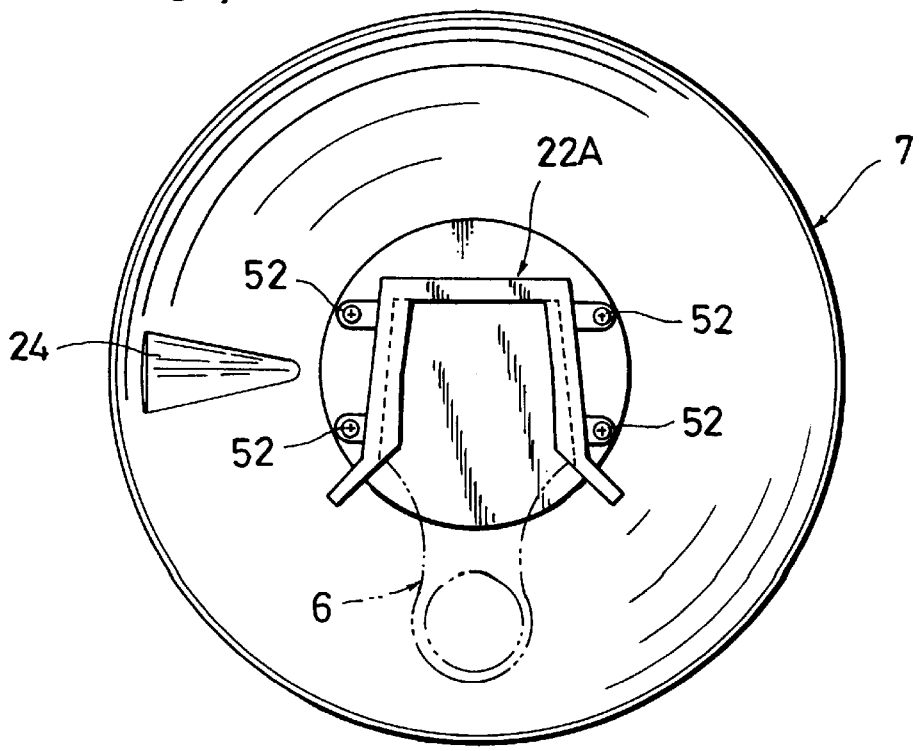
FIG. 57 is an explanation view about a mounted condition to the other way of a fitting member showing a fifteenth embodiment of the present invention.
Figure 58:
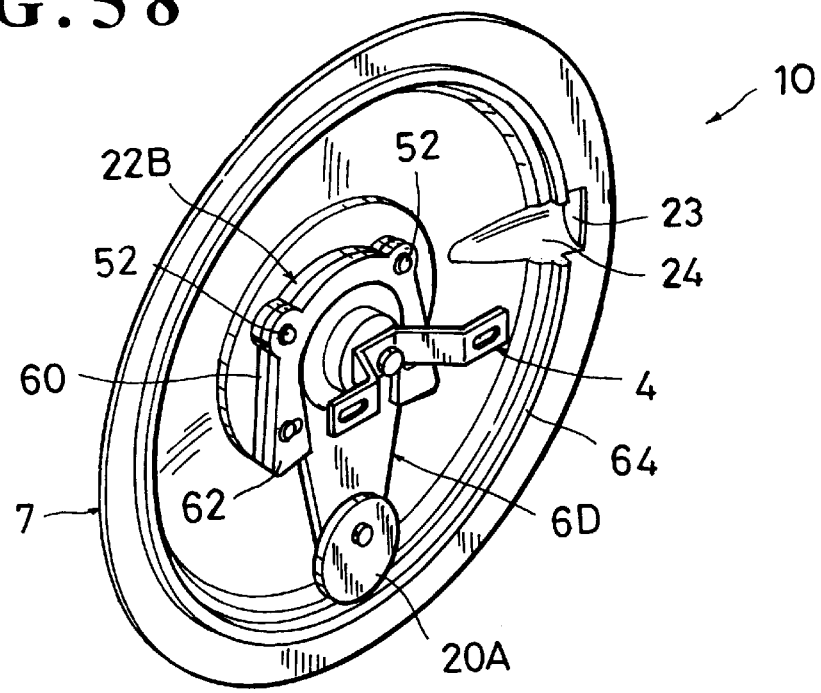
FIG. 58 is a perspective view from back side showing a sixteenth embodiment of the present invention.
Figure 59:
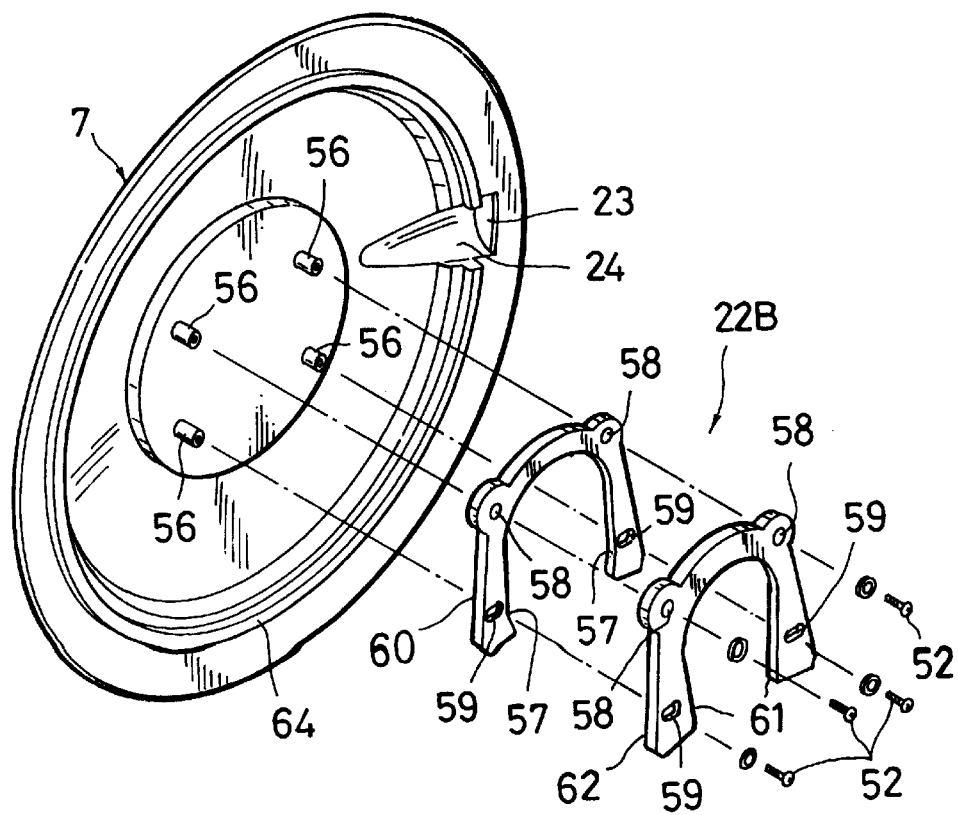
FIG. 59 is an explanation view of an fitting member showing a sixteenth embodiment of the present invention.
Figure 60:
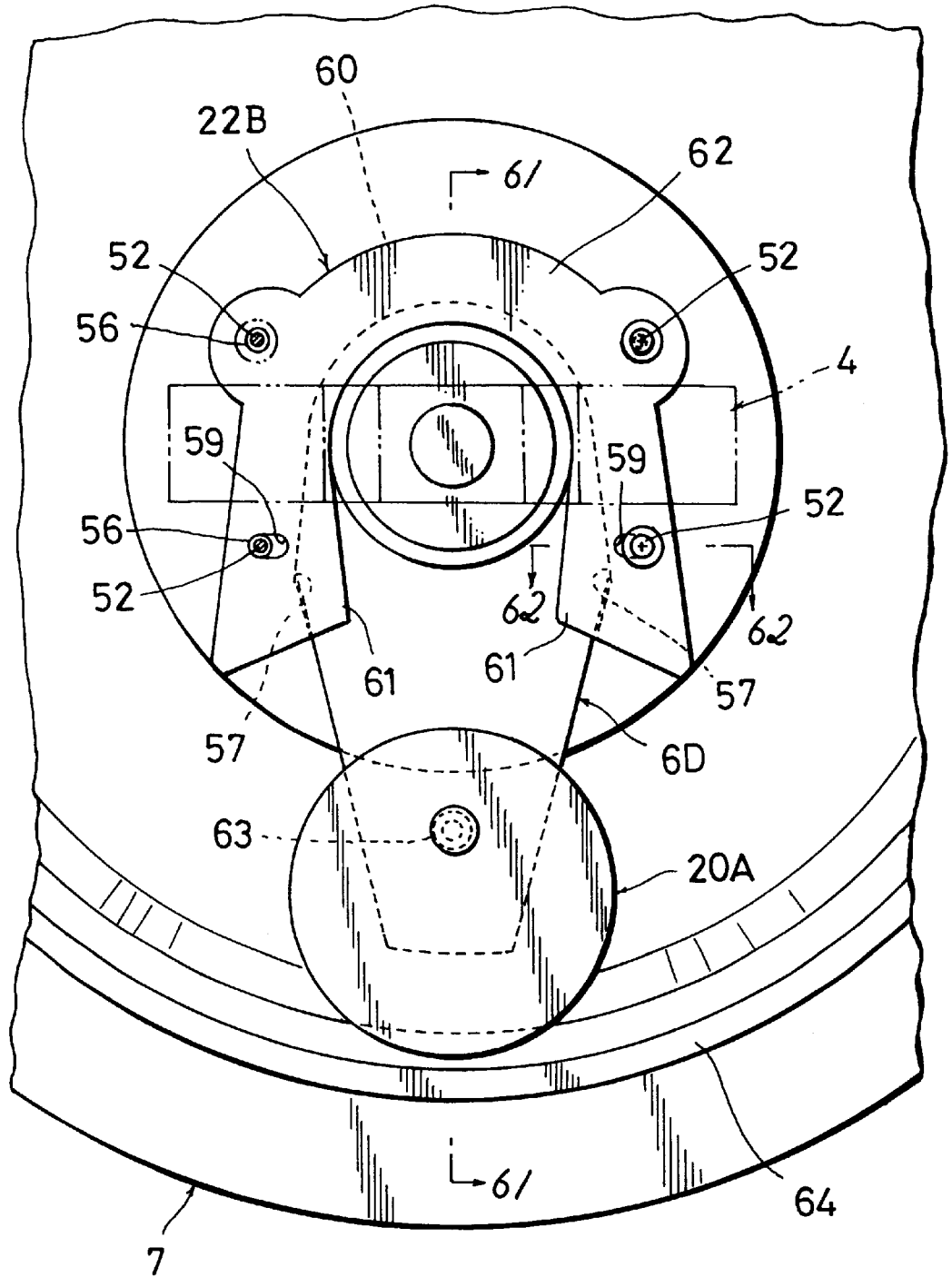
FIG. 60 is a mounted explanation view of a movable side fixture showing a sixteenth embodiment of the present invention.
Figure 61:
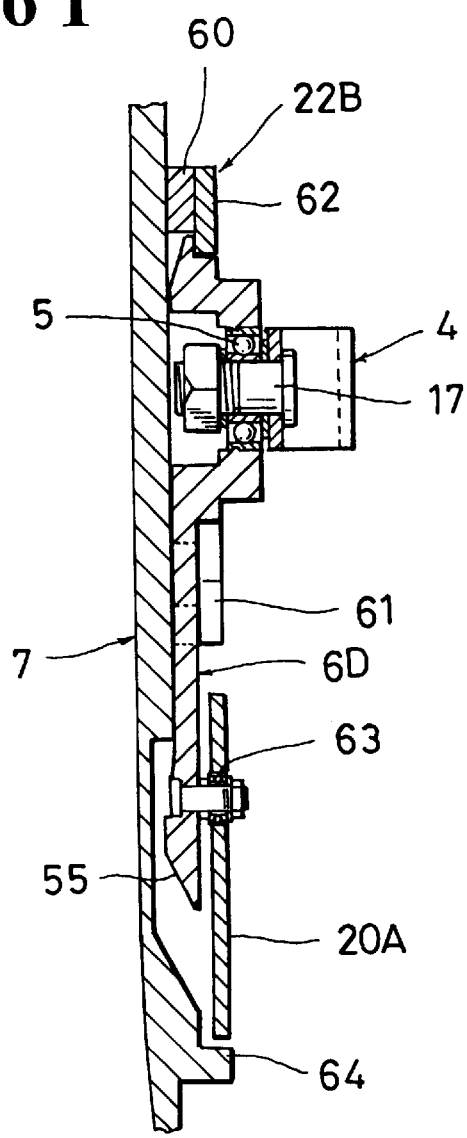
FIG. 61 is a cross-sectional view taken on the line 61—61 of FIG. 60.
Figure 62:
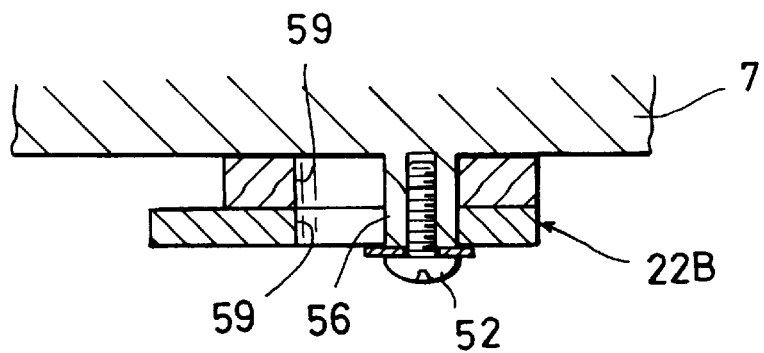
FIG. 62 is a cross-sectional view taken on the line 62—62 of FIG. 60.

FIGS. 47 to 49 illustrate a thirteenth embodiment of the pesent invention which is distinguished from the first embodiment by an engage piece 46 in the shape of a ring formed to the central part of back of a wheel cover body 7F covering to only part of the wheel bolt 8 of the wheel 3 and the ball bearing 5 as a bearing, formed the central part of the wheel 3, engageble fixed to a fitting part 47, moreover, the wheel cover body 7 mounted, inserting the bolt 29 as the movable side fixture into the rotating ring 5a of the ball bearing 5, and screwing the bolt 29 with a nut 37A formed a fitting gap 48 removing engaged the engage piece 46 in the shape of a ring at the outer part thereof. A wheel cover 1L according to the thirteenth embodiment will provide the same effects as the first embodiment.

FIGS. 50 to 53 illustrate a fourteenth embodiment of the present invention which is distinguished from the first embodiment by a nonreturn protection 49 can prevent to the backspin of the wheel cover body 7. A wheel cover 1M with the nonreturn protection 49 can prevent certainly to pivot the wheel cover body 7 when the automobile stops.

The nonreturn protection 49 comprises a ratchet gear 50 fixed to the wheel side fixture 4 and a set piece for nonreturn prevention 51, geared with the ratchet gear 50, pivoted by the movable side fixture 6.

Additionally, the nonreturn protection 49 provide the same effects if the bearing with rotating to one way, being on the market, is used instead of the ball bearing 5 as a bearing.

FIGS. 54 to 57 illustrate a fifteenth embodiment of the present invention which is distinguished from the first embodiment by the fact that a fitting part 22A, removably fitted the fitting piece 12 of the movable side fixture body 15 to the back of the wheel cover body 7, can be fixed to the upper and lower part set optionally up by a multiplicity of screws 52, that is, four pieces of screws 52. A wheel cover 1N mounted the fitting part 22A to the wheel cover body 7 with the multiplicity of screws can be used to mount to the wheel of right and left only the mounting direction of the fitting part 22A.

FIGS. 58 to 63 illustrate a sixteenth embodiment of the present invention which is distinguished from the fifteenth embodiment by set parts 54, 54 formed, with projecting in the shape of a chevron to the outer side, to both sides of nearly a bearing part 53 and a wheel cover 10 comprises a movable side fixture 6D formed an inlination for removing 55 at the top thereof, a fitting part 22B comprised with a first fitting member 60 and a second fitting member 62, a weight 20A pivotably mounted to the top of the movable side fixture 6D through a bearing 63 by a dead weight and a prevention piece for going 64. The first fitting member 60 is fixed with fanning out of the edge of opning thereof on the inner wall of the wheel cover body 7 with a multiplicity of screws 52, that is, four screws 52, 52, 52, 52 screwed in nuts 56, 56, 56, 56 fixed to the wheel cover body 7 in this embodiment and formed set parts 57, 57 which are able to set with set parts 54, 54 of the movable side fixture 6D in the inner side part of the opening thereof, having nut insertable holes 58, 58 and nut insertable holes 59, 59 in the shape of lengthy hole. The second fitting member 62 is positioned at an uuper part of the first fitting member 60 and formed set parts 61, 61 set with the outer of the bearing part 53 of the movable side fixture 6D, having the nut insertable holes 58, 58 and the nut insertable holes 59, 59 in the shape of lengthy hole, and used both as fitting members and a cover which can cover the circumference of the bearing part 53 of the movable side fixture 6D. The preventive piece for going 64 projects in the shape of a ring to the back side of te nearly outer part of the wheel cover body 7, and can prevent to come out with touching to the weight 20A when the wheel cover body 7 removes to the going direction and can pass through the inclination for removing 55 of the movable side fixture 6D when the wheel cover body 7 is removed with moving the weight 20 to the upper part thereof. A wheel cover 10 according to the sixteenth embodiment can prevent to go the wheel cover body 7 during use due to touch the wheel cover body 7 with the preventive piece for going 64 and weight 20A.

Moreover, th rotating of the wheel cover body 7 can be prevented with the effect to come to the end of rotating or pivotting due to the weight 20A pivotably mounted to the end of the movable side fixture 6D with a dead weight thereof.

Figure 63:
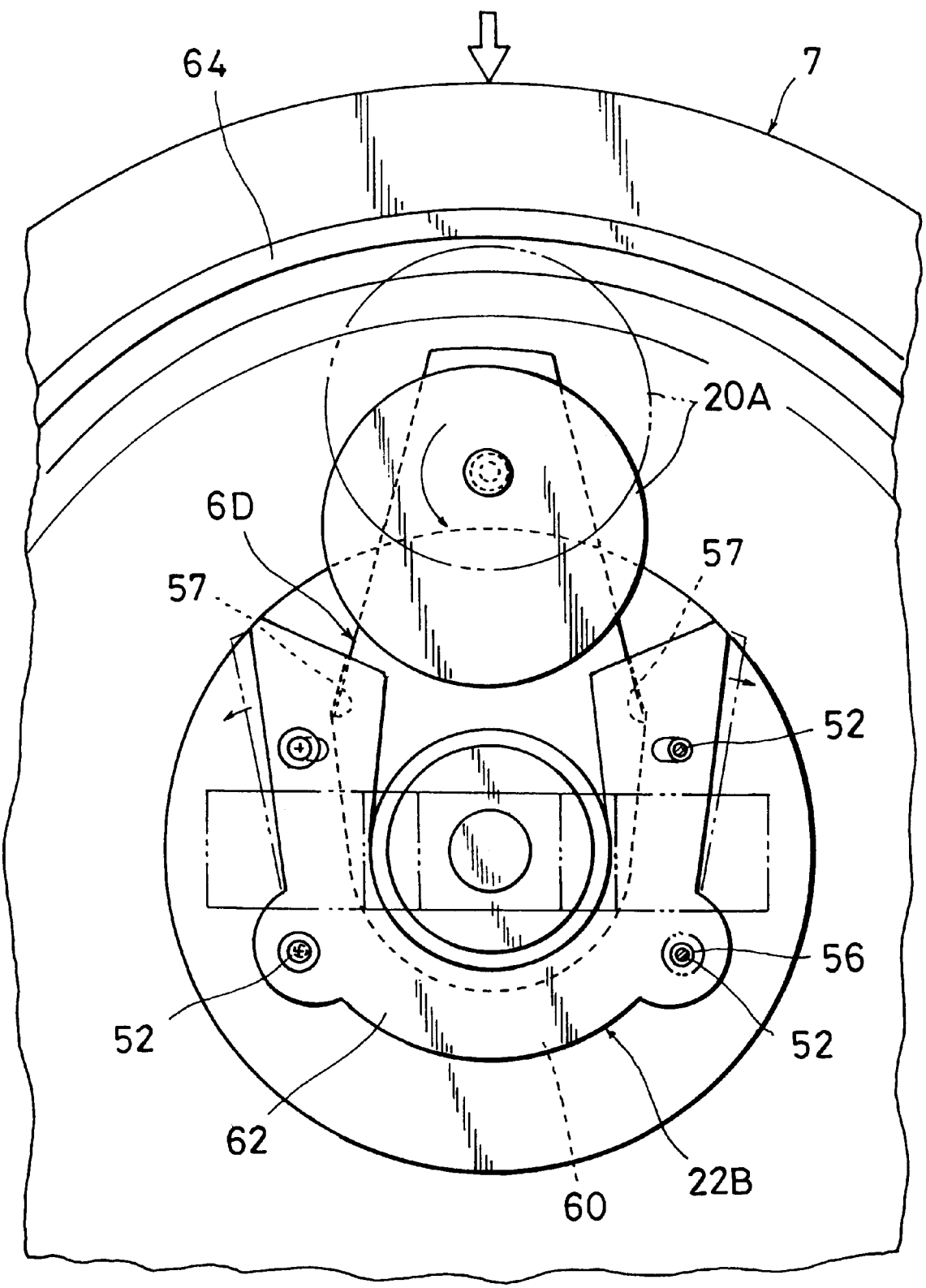
FIG. 63 is an explanation view of a removing condition showing a sixteenth embodiment of the present invention.

Aditionaly, the wheel cover body 7 can remove to slide the inclination for removing 55 with the end of the movable side fitxture 6D on the preventive piece for going 64 because the weight pivots to the downward, removing to slide the wheel cover body 7 to the upward due to be positioned the end of te movable side fixture 6D to the upper aprt as illustrate FIG. 63.

Figure 64:
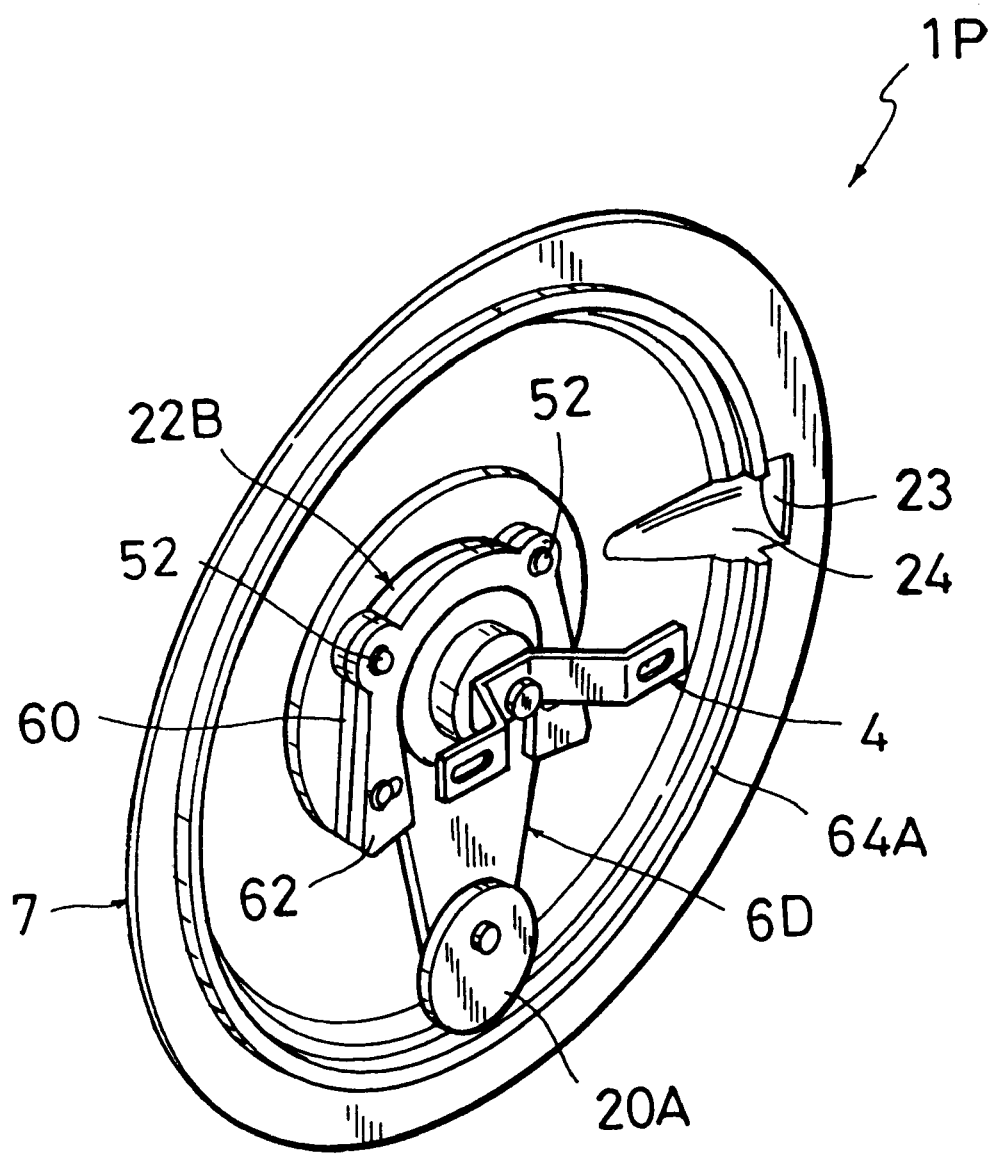
FIG. 64 is a perspective view from back side showing a seventeenth embodiment of the present invention.
Figure 65:
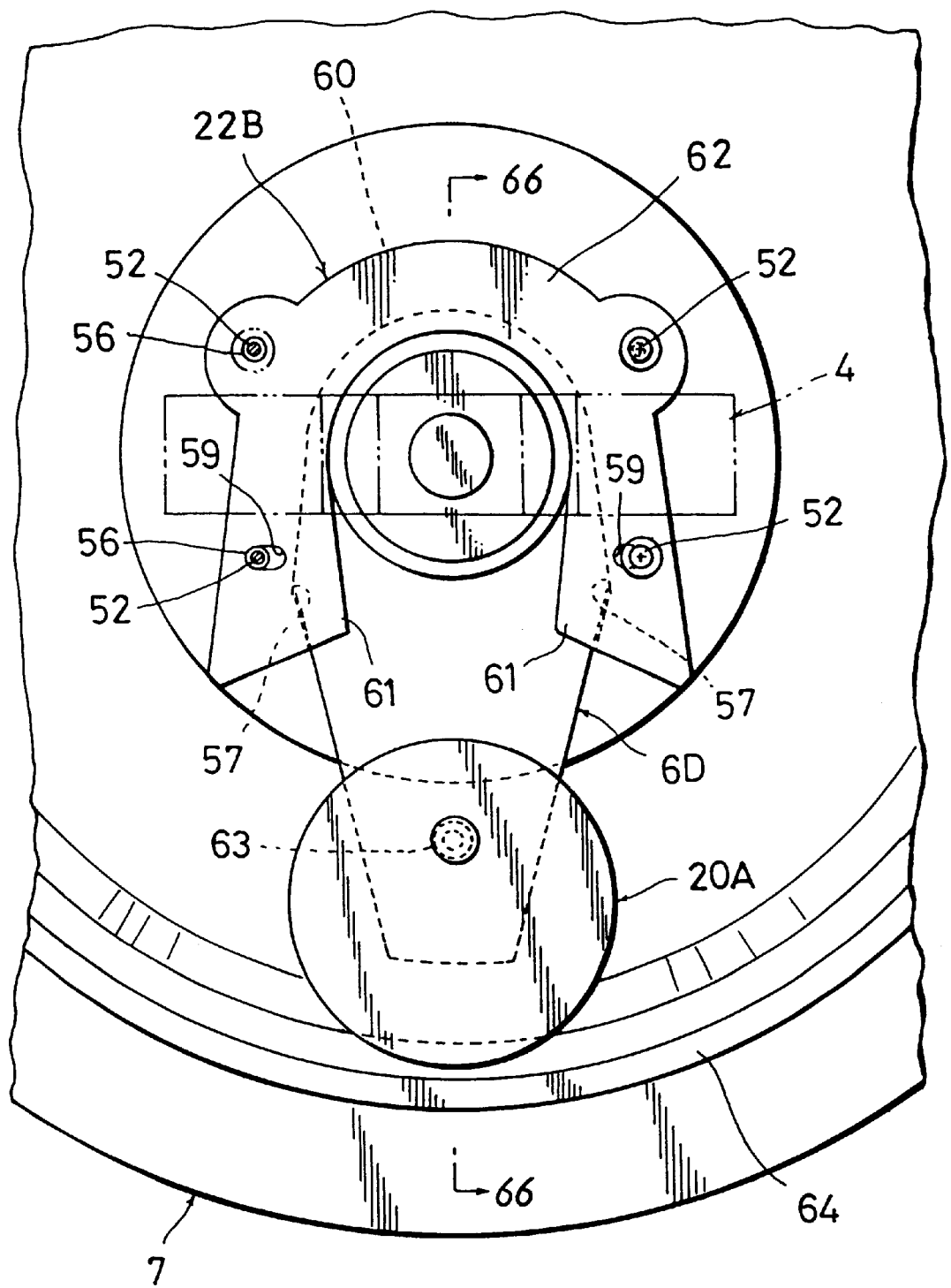
FIG. 65 is a mounting explanation view of a movable side fixture showing a seventeenth embodiment of the present invention.
Figure 66:
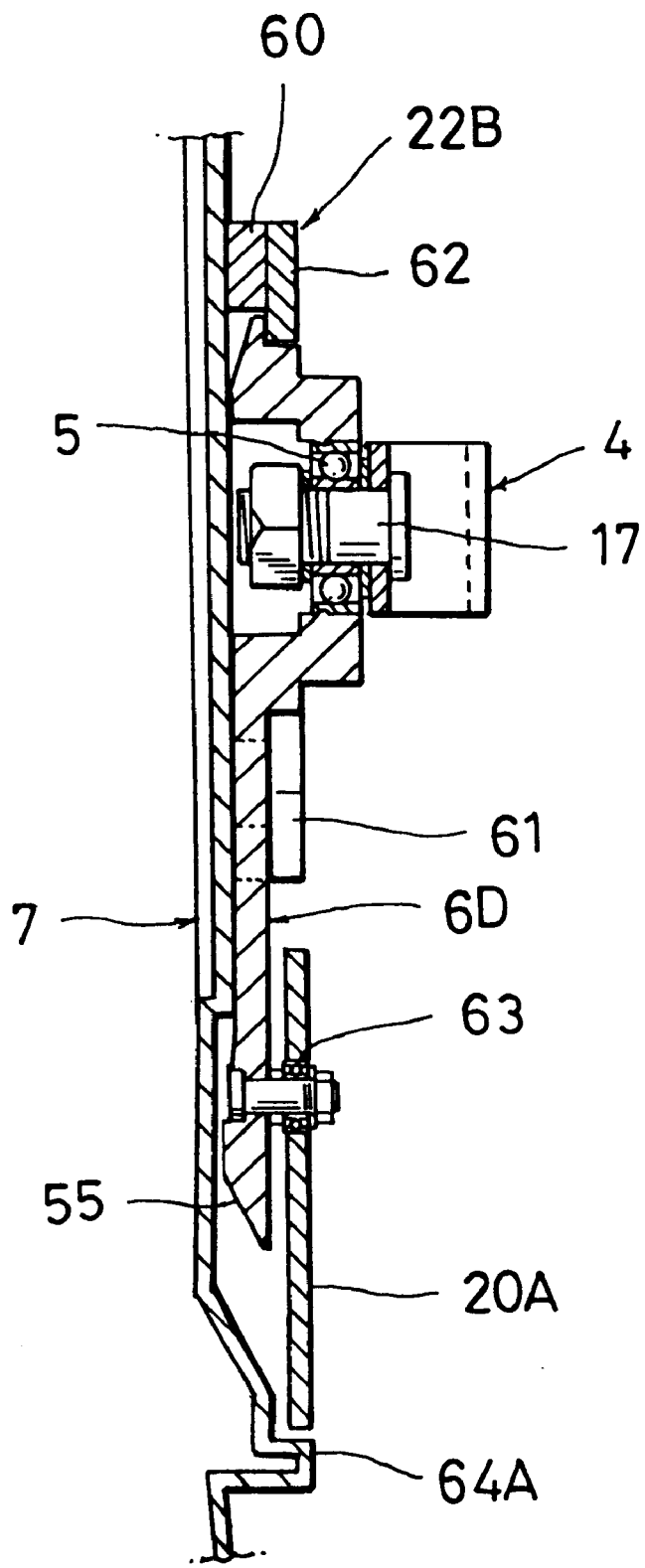
FIG. 66 is a perspective view taken on the line 66—66 of FIG. 65.
Figure 67:
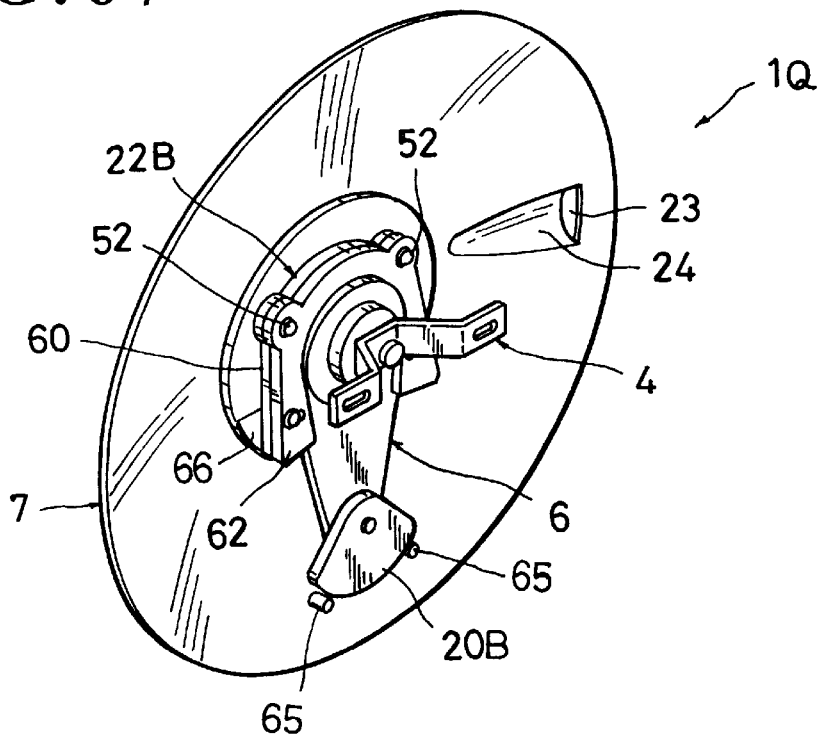
FIG. 67 is a perspective view from back side showing an eighteenth embodimentof the present invention.
Figure 68:
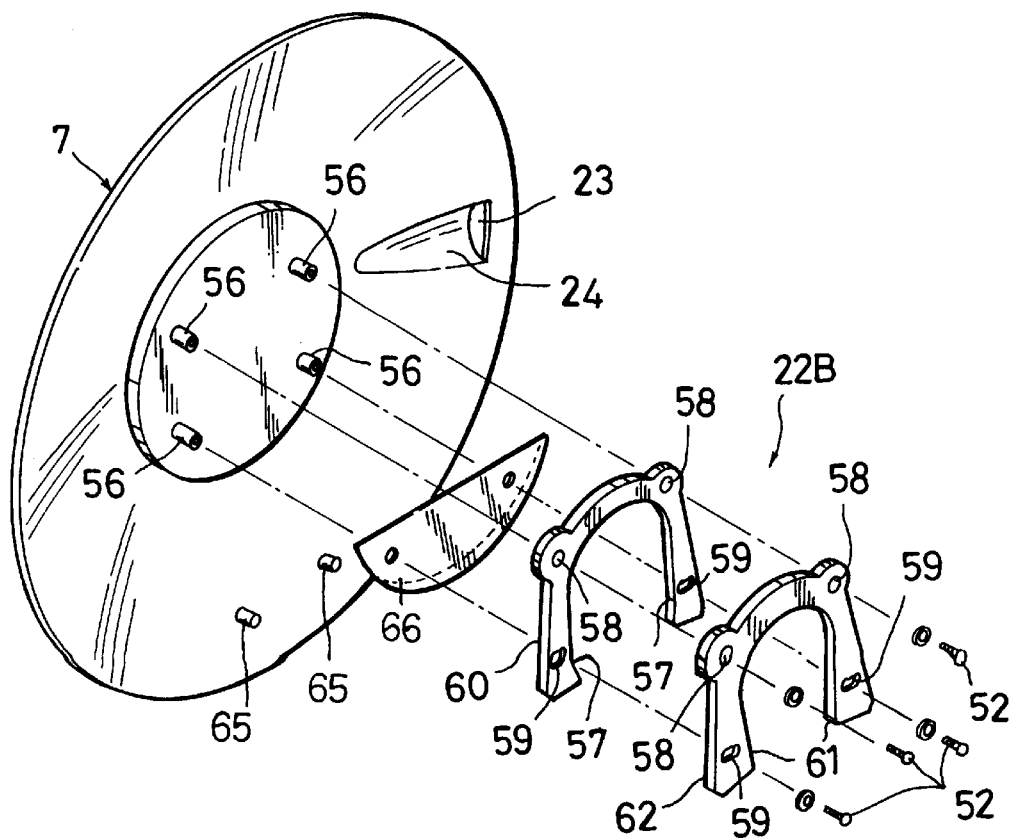
FIG. 68 is an explanation view of a fitting member showing an eighteenth embodiment of the present invention.
Figure 69:
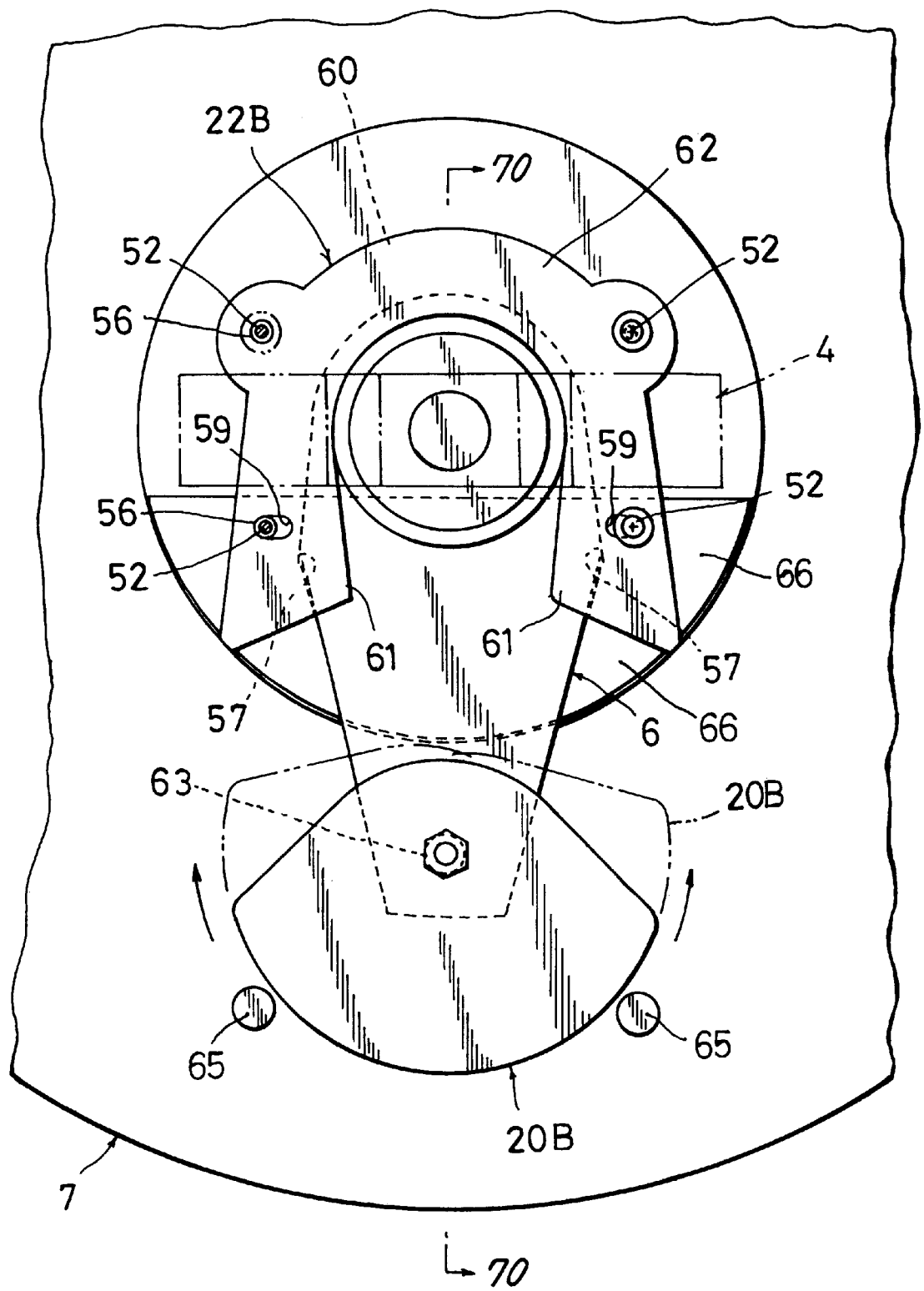
FIG. 69 is a mounting explanation view of a movable side fixture showing an eighteenth embodiment of the present invention.
Figure 70:
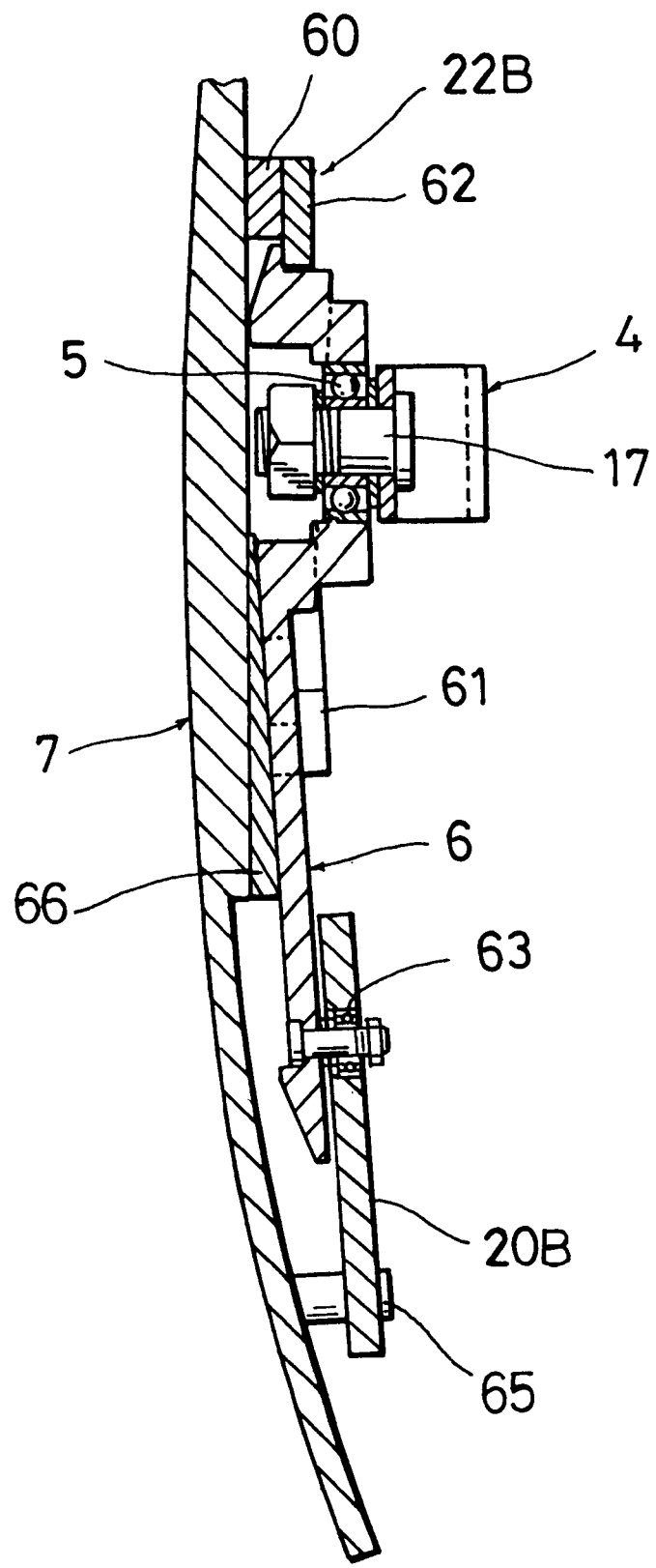
FIG. 70 is a cross-sectional view taken on the line 70—70 of FIG. 69.

FIGS. 64 to 66 illustrate a seventeenth embodiment of te present invention which is distinguished from the sixteenth embodiment by a preventive piece for going 64A molded with projection to the back to the nearly outer part of the wheel cover body 7. A wheel cover 1P with the wheel cover body 7 according to te seventeenth embodiment will povide the same effects as the sixteenth embodiment.

FIGS. 67 to 71 illustrate an eighteenth embodiment of te present invention which is distinguished from the sixteenth embodiment by a fan-shaped weight 20B pivotably mounted to the end of the movable side fixture 6, preventive pieces for going 65, 65 formed of inner wall of the wheel cove body 7, preventing the going with touching with the weight 20B when cover body 7 moves to the removing direction during use, and a fitting part 22B used to a guide piece 66 in the shape of tapering, can insert easily to the movable side fixture 6, having higher opening part side and lower inner part side. A wheel cover 1Q according to the eighteenth embodiment will provide the same effects as the sixteenth embodiment.

Moreover, in each of embodiments of the present invention, the use of the ball bearing as a bearing is explained, however, the present invention may use bearings which can rotatably support to the other bearings or axles.

Additionaly, in each of the embodiments, the oppsition board with flxibility to prevent to pivot the wheel cover body during stopping may be mounted to the wheel cover body, movable side fixture, fixable side fixture and/or the other part as to touch one part of the wheel. In this case, the wheel cover body can be prevented easily to pivot when the cart starts, with the opposition board mounted to the nearly center of axle rather than the part to apart from the center of axle.

As set forth above, the advantages of the present invention are as follows:

(1) A wheel cover comprising: a fixable side fixture fixably secured to the center of a wheel of a car, as to be able to position to the central part thereof; a movable side fixture pivoyably mounted to the central part of the fixable side fixture through a bearing; a wheel cover body in the shape of a disk mounted to the movable side fixture, having a space between the wheel; and a weight mounted to said movable side fixture or wheel cover body, in order to prevent to rotate the wheel cover body. Therefore, the wheel cover body is kept with stillness and stopping condition at fixed position by the weight, during running wheel cover body can be kept with the stillness condition because the movable side fixture.

Accordingly, people can see exactly the advertisement, publicity or design performed on the surface of wheel cover body because wheel cover body can be kept the stillness condition at fixed position during stopping and running, moreover, it can be prevented to cause the car accident with roll-up by a bus or a track because the wheel is covered by the wheel cover body in efficiency.

(2) As discussed above, it is easy to attract the design e. g. advertisement or publicity people attention and the effects of advertisement or publicity can be improve because the wheel cover body can pivotably swing a little due to the weight during stopping.

(3) As discussed above, the inspection of wheel bolt can be conducted easily after wheel cover body is removed easily when the bus is inspected at a commencement of work because it is easy to mount and remove the wheel cover body, and use it with simple structure.

(4) As discussed above, the air current guide part projecting in the shape of a nose can pass through the air currnt happened during running to the upper and lower part thereof because it is formed of the part positioned to the backward of te wheel cover body.

Therefore, the pivotting of the wheel cover body can be prevented.

(5) As discussed above, the claim (2) and (3) provide the same effects as above advantages of (1) to (4).

(6) As discussed above, the claim (4) to (8) provide the same effects as above advantages of (1) to (3).

Additional Remark

1. A wheel cover comprising: a fixable side fixture fixably mounted to the center of a wheel of a car, as to be able to position to the central part thereof; a movable side fixture rotatably mounted to the central part of the fixable side fixture through a bearing, formed of a fitting part in at least one side thereof and an inclination for removing on the top thereof; a weight pivotably mounted, with dead weight itself, to the top of the movable side fixture through the bearing; a wheel cover body in the shape of a disk mounted to the inserted movable side fixture with having a space between the wheel, mounted a fitting member with the fitting part and a fitted fitting part into an inside wall thereof; and a preventive piece for going, in the shape of a ring, mold with projection to the back to the the wheel cover body, and can prevent to come out with touching to the weight when the wheel cover body removes to the going direction, can pass through the inclination for removing of the movable side fixture when the wheel cover body is removed with moving the weight to the upper part thereof.

2. A wheel cover comprising: a fixable side fixture fixably mounted to the center of a wheel of a car, as to be able to position to the central part thereof; a movable side fixture pivotably mounted to the central part of the fixable side fixture through a bearing; a weight pivotably mounted to the top of the movable side fixture through the bearing; a wheel cover body in the shape of a disk removably fitted, having a space between the wheel, to the movable side fixture; and a preventive piece for going, in the shape of a ring, mold with projection to the back to the the wheel cover body, and can prevent to come out with touching to the weight when the wheel cover body removes to the going direction, can pass through the inclination for removing of the movable side fixture when the wheel cover body is removed with moving the weight to the upper part thereof.

What is claimed is:

1. A wheel cover comprising:
   a mounting member fixedly mountable to a center of a wheel of a vehicle;
   a bearing centrally mounted to said mounting member;
   a movable member pivotably mounted to the mounting member through the bearing;
   a wheel cover body in the shape of a disk receivable to the movable member, said wheel cover body including structure carried centrally on a side thereof facing inwardly of the wheel for fastenably engaging corresponding structure carried on said movable member in a manner allowing removable connection of the wheel cover body to the movable member while preventing relative rotational movement therebetween, and when so received, a space being defined between the wheel and the wheel cover to permit concentric rotation of said wheel cover body and said movable member together relative said wheel about said bearing, said wheel cover body including structure cooperative with receiving structure carried on said movable member for permitting slidable reception of said wheel cover body to said movable member along a receiving direction orthogonal to the rotational axis of the wheel; and
   a weight mounted to said movable member for preventing rotation of the movable member and the wheel cover body by operation of gravity thereon as the wheel of the vehicle is rotated.

2. A wheel cover according to claim 1, wherein the weight is provided as a weighted portion carried on said movable member in a position radially outward from a point of mounting to said bearing in order to prevent rotation of the wheel cover body when received to said movable member.

3. A wheel cover comprising:
   a mounting member fixedly mountable to a center of a wheel of a vehicle;
   a bearing centrally mounted to said mounting member;
   a movable member pivotably mounted to the mounting member through the bearing;
   a wheel cover body in the shape of a disk receivable to the movable member, said wheel cover body including structure carried centrally on a side thereof facing inwardly of the wheel for fastenably engaging corresponding structure carried on said movable member in a manner allowing removable connection of the wheel cover body to the movable member while preventing relative rotational movement therebetween, and when so received, a space being defined between the wheel and the wheel cover to permit concentric rotation of said wheel cover body and said movable member together relative said wheel about said bearing;

a weight mounted to said movable member for preventing rotation of the movable member and the wheel cover body by operation of gravity thereon as the wheel of the vehicle is rotated; and the wheel cover body including an air current guide part formed generally in the shape of a nose, and positioned on said wheel cover body radially outward of a center thereof, said air current guide part presenting structure which is generally bilaterally symmetric about an air-current conduction axis which extends radially outward of the center of the wheel cover body, said air current guide being arranged on said wheel cover body such that it is oriented rearward of the vehicle when the wheel cover body is received to the movable member and in a weighted orientation, whereby an air current created when the vehicle is moving is codirectionally conducted along said air-current conduction axis in a manner providing resistance against rotation of said wheel cover body.

4. A wheel cover, comprising:

a mounting bracket mountable on a wheel of a vehicle in fixed engagement therewith, said mounting bracket including a structural configuration attachable to a central region of the wheel;

a movable member pivotably mounted to the mounting bracket for permitting rotation of the movable member relative to the wheel about a rotational axis of the wheel;

a wheel cover body receivable to the movable member in a manner inhibiting relative rotational movement therebetween, there being sufficient clearance between the wheel cover body and the wheel when the wheel cover body is received thereto to permit concentric rotation of said wheel cover body relative said wheel about said rotational axis; and a weight mounted to a one of said movable member and said wheel cover body and positioned in a manner creating a center of gravity located radially outward of a center of the wheel cover body such that the wheel cover body tends to move to a position in which a straight locus connecting the center of the wheel cover body and the center of gravity extends vertically, whereby a desired rotational orientation of the wheel cover body is generally maintained while the wheel is stationary and during rotation thereof by operation of gravity.

5. A wheel cover according to claim 4, further comprising a bearing for pivotably mounting said movable member to said mounting bracket.

6. A wheel cover according to claim 4, wherein the weight includes a weighted portion carried on said movable member in a position radially outward from a point of mounting to said bearing in order to inertially inhibit rotation of the wheel cover body when received to said movable member.

7. A wheel cover, comprising:

a mounting bracket mountable on a wheel of a vehicle in fixed engagement therewith;

a movable member pivotably mounted to the mounting bracket for permitting rotation of the movable member relative to the wheel about a rotational axis of the wheel;

a wheel cover body receivable to the movable member in a manner inhibiting relative rotational movement therebetween, there being sufficient clearance between the wheel cover body and the wheel when the wheel cover body is received thereto to permit concentric rotation of said wheel cover body relative said wheel about said rotational axis;

a weight mounted to a one of said movable member and said wheel cover body and positioned in a manner creating a center of gravity located radially outward of a center of the wheel cover body such that the wheel cover body tends to move to a position in which a straight locus connecting the center of the wheel cover body and the center of gravity extends vertically, whereby a desired rotational orientation of the wheel cover body is generally maintained while the wheel is stationary and during rotation thereof by operation of gravity; and the wheel cover body including an air current guide positioned on said wheel cover body radially outward of a center thereof, said air current guide presenting structure for conducting air flowing therepast codirectionally with an air-current conduction axis of said air current guide, said air-current conduction axis being positioned orthogonally with said straight locus, whereby an air current created when the vehicle is moving is codirectionally conducted along said air-current conduction axis in a manner providing additional resistance against rotation of said wheel cover body.

8. A wheel cover according to claim 7, wherein said air current guide extends radially outward of the center of the wheel cover body, said air current guide being arranged on said wheel cover body such that it is oriented rearward of the vehicle when the wheel cover body is received to the movable member.

9. A wheel cover according to claim 7, wherein said air current guide is generally bilaterally symmetric about said air-current conduction axis.

10. A wheel cover according to claim 4, wherein said wheel cover body including structure cooperative with receiving structure carried on said movable member for permitting slidable reception of said wheel cover body to said movable member along a receiving direction orthogonal to the rotational axis of the wheel.

11. A wheel cover according to claim 10, wherein a portion of said movable member located radially outward of said receiving structure protrudes at least partially through said wheel cover body.

12. A wheel cover according to claim 11, wherein said portion of said movable member includes structure engageble with said wheel cover body for safeguarding against unintentional detachment of said wheel cover said movable member.

13. A wheel cover, comprising:

a mounting bracket mountable on a wheel of a vehicle in fixed engagement therewith;

a movable member pivotably mounted to the mounting bracket for permitting rotation of the movable member relative to the wheel about a rotational axis of the wheel;

a wheel cover body receivable to the movable member in a manner inhibiting relative rotational movement therebetween, there being sufficient clearance between the wheel cover body and the wheel when the wheel cover body is received thereto to permit concentric rotation of said wheel cover body relative said wheel about said rotational axis, said wheel cover body including structure cooperative with receiving structure carried on said movable member for permitting slidable reception of said wheel cover body to said movable member along a receiving direction orthogonal to said rotational axis of the wheel; and a weight mounted to a one of said movable member and said wheel cover body and positioned in a manner creating a center of gravity located radially outward of a center of the wheel cover body such that the wheel cover body tends to move to a position in which a straight locus connecting the center of the wheel cover body and the center of gravity extends vertically, whereby a desired rotational orientation of the wheel cover body is generally maintained while the wheel is stationary and during rotation thereof by operation of gravity.

14. A wheel cover according to claim 10, wherein said receiving direction extends vertically.

15. A wheel cover according to claim 13, wherein the wheel cover body includes an air current guide positioned on said wheel cover body radially outward of a center thereof, said air current guide presenting structure for conducting air flowing therepast codirectionally with an air-current conduction axis of said air current guide, said air current axis being positioned orthogonally with said straight locus, whereby an air current created when the vehicle is moving is codirectionally conducted along said air-current conduction axis in a manner providing additional resistance against rotation of said wheel cover body.

* * * * *